United States Patent
Williams et al.

(10) Patent No.: US 10,882,456 B2
(45) Date of Patent: *Jan. 5, 2021

(54) RAIL SYSTEM FOR VEHICLE SHELVING AND CANOPIES

(71) Applicant: CurrentWrx, LLC, St. George, UT (US)

(72) Inventors: Patrick Williams, St. George, UT (US); Brad Harrell, St. George, UT (US); James Wilson, St. George, UT (US); Brian Stevens, St. George, UT (US); Jordy Pincock, St. George, UT (US); Doyle Hansen, St. George, UT (US)

(73) Assignee: CurrentWrx, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,992

(22) Filed: Aug. 27, 2019

(65) Prior Publication Data

US 2020/0086802 A1 Mar. 19, 2020

Related U.S. Application Data

(63) Continuation of application No. 15/901,867, filed on Feb. 21, 2018, now Pat. No. 10,414,342.

(Continued)

(51) Int. Cl.
*B60R 5/04* (2006.01)
*F16B 12/10* (2006.01)
(Continued)

(52) U.S. Cl.
CPC .............. *B60R 5/041* (2013.01); *B60J 7/041* (2013.01); *B60P 3/14* (2013.01); *B60R 5/003* (2013.01);
(Continued)

(58) Field of Classification Search
CPC ........ F16C 29/005; F16C 29/045; B60P 3/14; B60R 11/06; B60R 13/01; B60R 5/041; B60R 11/00
(Continued)

(56) References Cited

U.S. PATENT DOCUMENTS 3,368,839 A 2/1968 Stewart
4,375,195 A 3/1983 Tsuboi
(Continued)

FOREIGN PATENT DOCUMENTS

GB 2244959 A 12/1991

OTHER PUBLICATIONS

Extended European Search Report, Currentwrx, LLC, European Patent Application No. 18758349.7, PCT/US2018019064 (dated Nov. 9, 2020).

*Primary Examiner* — Adam J Waggenspack
(74) *Attorney, Agent, or Firm* — Robert D. Spendlove; Gurr Brande & Spendlove, PLLC

(57) ABSTRACT

A vehicle rail system has a frame mountable to a vehicle, the frame having a plurality of support legs, the support legs interconnected via support beams. One or more fixed rails are mountable to the support frame, each fixed rail comprising a plurality of bearings thereon and configured to receive a sliding rail, the sliding rail having a plurality of grooves for receiving the bearings of the fixed rail so as to be slidable thereon. The bearings are located along regular intervals of the fixed rails on each non-mounted side. The sliding rail is then able to slide along the bearings of the fixed rail, extending to the exterior of the frame mounted in the vehicle.

20 Claims, 33 Drawing Sheets

Related U.S. Application Data

(60) Provisional application No. 62/590,010, filed on Nov. 22, 2017, provisional application No. 62/478,168, filed on Mar. 29, 2017, provisional application No. 62/461,781, filed on Feb. 21, 2017.

(51) Int. Cl.
| | |
|---|---|
| *B60R 5/00* | (2006.01) |
| *B60P 3/14* | (2006.01) |
| *B60J 7/04* | (2006.01) |
| *B60R 9/06* | (2006.01) |
| *B62D 33/04* | (2006.01) |

(52) U.S. Cl.
CPC .............. *B60R 9/065* (2013.01); *B62D 33/04* (2013.01); *F16B 12/10* (2013.01); *F16B 2012/103* (2013.01)

(58) Field of Classification Search
USPC ...... 224/495–496, 281; 296/3; 410/150, 152
See application file for complete search history.

(56) References Cited

U.S. PATENT DOCUMENTS

| | | |
|---|---|---|
| 4,889,377 A | 12/1989 | Hughes |
| 5,893,598 A | 4/1999 | Silkowski |
| 10,414,342 B2 * | 9/2019 | Williams .................. B60P 3/14 |

* cited by examiner

RAIL SYSTEM FOR VEHICLE SHELVING AND CANOPIES

CROSS-REFERENCE TO RELATED APPLICATIONS

This application is a continuation of U.S. patent application Ser. No. 15/901,867, filed on Feb. 21, 2018, which application claims the benefit of U.S. Provisional Application Ser. No. 62/461,781, filed on Feb. 21, 2017, and claims the benefit of U.S. Provisional Application Ser. No. 62/478,168, filed on Mar. 29, 2017, and further claims the benefit of U.S. Provisional Application Ser. No. 62/590,010, filed on Nov. 22, 2017, all of which are incorporated herein in their entireties.

TECHNICAL FIELD

The present disclosure relates to storage systems for vehicles. More particularly, the present disclosure relates to a rail system allowing vehicle shelving and/or canopies to be extended to the exterior of the vehicle. Additionally, a cart is provided for aiding in the removal and attachment of the shelving to the vehicle.

BACKGROUND

From construction trucks, to service vans, to delivery vehicles, operators are constantly needing to store and access items in their vehicles. However, accessing stored items has typically required a user to climb into the vehicle. This is not only burdensome, but can be dangerous. For example, in a serviceman's van, any number of tools and ladders, may be found, which are a hazard to a user when climbing into the van to retrieve items. Further, the frequent climbing in-and-out of the van, as well as attempting to exit the van with heavy items, can wear on a user's joints and back, causing long-term health problems. Further, retrieving heavy items, such as those that require more than one person to transport, become extremely difficult and dangerous when both users attempt to maneuver inside of the vehicle.

Attempts in the prior art have been made to solve some of these problems, but they still fall short. For example, organizational shelving on the sidewall of a vehicle helps to keep items organized, but fails to alleviate the problem of a user needing to enter the vehicle for retrieval. Bed slides exist that allow a user to extract items sitting on the floor, but this requires a user to keep all items on the floor, as opposed to the organizational storage bins on the sidewalls. One attempt, U.S. Pat. No. 4,889,377 to Hughes, attempted to solve the problem by disclosing a storage carriage that was slidable on a frame mounted to the side of a vehicle and extendable from the vehicle. However, the carriage and channels disclosed have a configuration that only allows for a nominal amount of weight to be placed thereon without compromising the slidability, limiting the use of the carriage. Further, the carriage could only be locked when fully extended or fully inserted inside a vehicle, and failed to provide a means for the slide to be retracted when on a hill. The prior art also failed to provide for an electronic means for extending and retracting the shelving, as well as protective measures to prevent injury during the extending. Further, it may be beneficial in some industries, such as the package delivery industry, to allow the shelving to not only extend from the vehicle, but be removable such that workers may organize packages on a unit before insertion into the vehicle. The prior art does not contemplate such systems.

As such, despite the prior art's attempts, there still remains a need for a vehicle rail system that allows a user to extend shelving thereon without entry into a vehicle and that provides for the storage of extremely heavy items, that provides for multiple locking positions, that may be motorized for ease of extension and insertion, and that provides for multi-surface applications, including the ceiling for both storage and a canopy system. Further, there is a need for a system that is removable so as to present easy transfer of items stored on the shelving. The present disclosure seeks to solve these and other problems.

SUMMARY OF EXAMPLE EMBODIMENTS

In one embodiment, a vehicle rail system comprises a frame mountable in the cargo area of a vehicle, the frame comprising a plurality of support legs, the support legs interconnected via horizontal beams. One or more fixed rails are mountable to the frame, each fixed rail comprising a plurality of bearings thereon and configured to receive a sliding rail, the sliding rail comprising a plurality of grooves for receiving the bearings of the fixed rail so as to be slidable thereon. In one embodiment, the bearings are located along regular intervals of the fixed rails on each non-mounted side (i.e., three of the four sides of the cuboid or square prism). The sliding rail is then able to slide along the bearings of the fixed rail, extending to the exterior of the frame mounted in the vehicle.

In one embodiment, a vehicle rail system comprises a fixed rail, a sliding rail on the fixed rail, and shelving coupled to the sliding rail, wherein the sliding rail and shelving may be extended to the exterior of the vehicle.

In one embodiment, a vehicle rail system comprises a sliding canopy, wherein a fixed rail is mounted on, or proximal to, the ceiling of a vehicle, a sliding rail is slidable on the fixed rail, and a canopy is coupled to the sliding rail; wherein the sliding rail and canopy are extendable to the exterior of the vehicle.

In one embodiment, a vehicle rail system comprises a drive system for sliding the sliding rail on the fixed rail. The drive system may utilize a rack and pinion system, a screw drive, chain drive, or similar linear actuation components.

In one embodiment, a vehicle rail system comprises one or more proximity sensors that activate a braking system, wherein the braking system is activated upon receiving a corresponding signal from the one or more proximity sensors.

In one embodiment, a vehicle rail system comprises a slidable bulkhead, the bulkhead coupled to, and slidable on, one or more fixed rails, the fixed rails coupled to one or more support legs of a frame, the fixed rails separating the driver's seat from the cargo compartment of the vehicle such that the bulkhead separates the driver from the cargo compartment.

In one embodiment, a vehicle rail system comprises a gantry coupled to a fixed rail, the fixed rail mounted on, or proximal to, the ceiling, the gantry slidable on the fixed rail such that the gantry is capable of extending to the exterior of the vehicle.

A cart apparatus to aid in the removal and replacement of wall shelving on the vehicle rail system, the cart comprising a base frame with a plurality of casters, a vertical support frame coupled to, and supported on, the base frame, the vertical support frame having a plurality of fixed rails thereon for engaging the sliding rails in the vehicle, the fixed rails being substantially similar to the fixed rails of the vehicle rail system. In one embodiment, the vertical support frame has one or more actuators (e.g., piston and cylinder)

to control the height and angle of the rails thereon for coupling to the sliding rail on varying terrain and/or vehicle heights.

DETAILED DESCRIPTION OF EXAMPLE EMBODIMENTS

Figure 1:
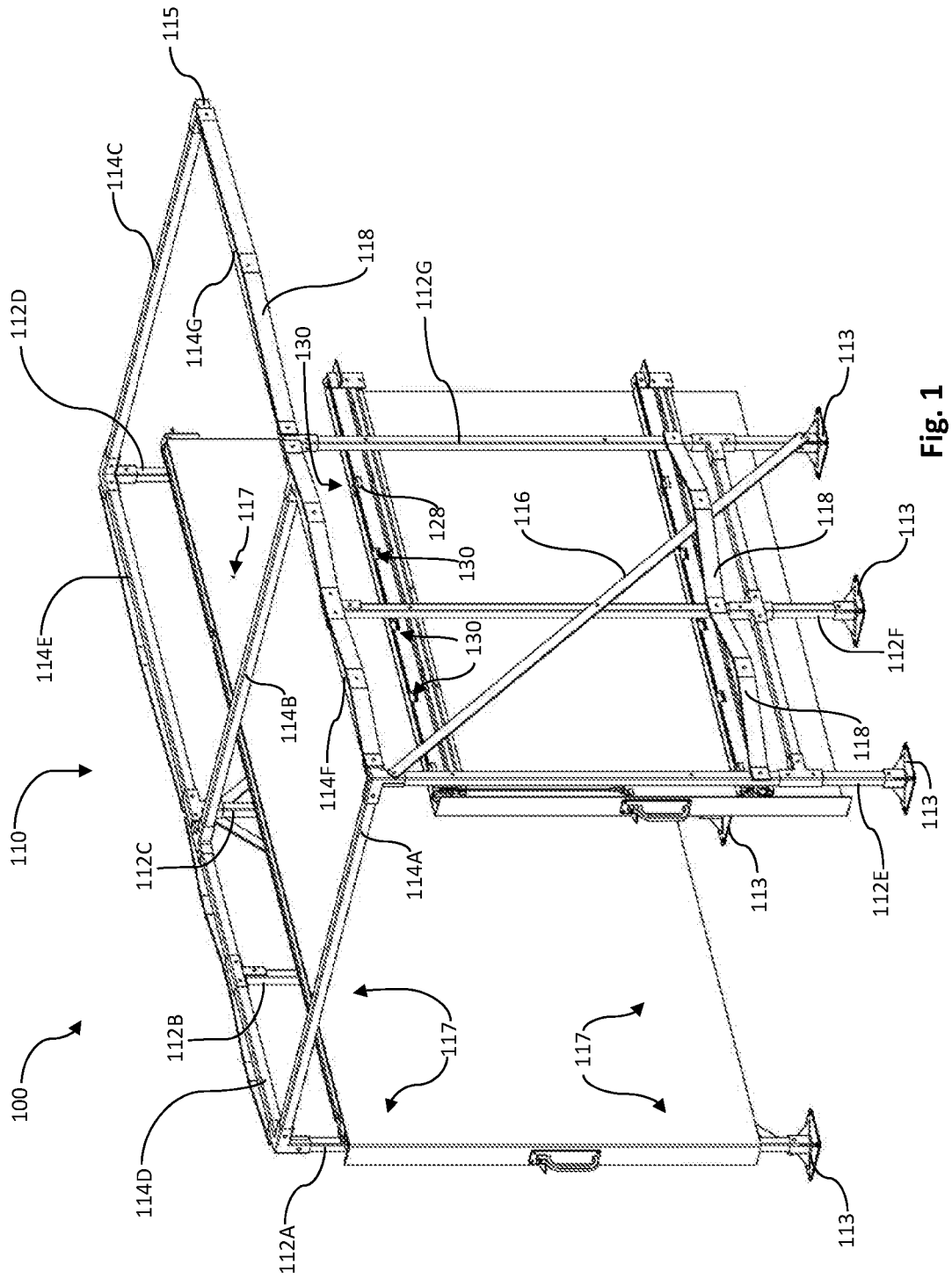
FIG. 1 is a perspective view of a rail system for mounting to a vehicle.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a vehicle rail system that allows a user to extend shelving thereon without entry into a vehicle and that provides for the storage of extremely heavy items, that provides for multiple locking positions, that may be motorized for ease of extension and insertion, and that provides for multi-surface application, including the ceiling for both storage and a canopy system. As will be appreciated from the below disclosure, the vehicle rail system shown and described herein solves these needs and others.

In one embodiment, as shown in FIG. 1, a rail system for mounting to a vehicle 100 comprises a frame 110 mountable to a vehicle, the frame comprising a plurality of support legs 112A-112G, the support legs 112A-112G interconnected via horizontal beams 114A-114G. The support legs 112A-112G may comprise base plates 113 for not only securing to the vehicle floor, but for also distributing the weight of the support legs 112A-112G. The base plates 113 may be bolted, screwed, or welded to the floor. The support legs 112A-112G may be coupled to the base plate 113 in any number of configurations, including in the center thereof or off-center. An off-center position of a base plate 113 may be useful when the base plates 113 would be in a different relative position to on another based upon the wheel-well, sidewall configuration, etc. In one embodiment, the frame 110 comprises a left rear support leg 112A and a right rear support leg 112E, each rear support leg having a bottom end adapted to attach to the vehicle via base plate 113, and a top end; a rear horizontal beam 114A coupled to the top end of each rear support leg 112A, 112E; a left front support leg 112C and a right front support leg 112G, each front support leg 112C, 112G having a bottom end adapted to attach to the vehicle via base plate 113, and a top end; a front horizontal beam 114B coupled to the top end of each front support leg 112C, 112G, a left side horizontal beam 114D coupled to the left rear support leg 112A and the left front support leg 112C; and a right side horizontal beam 114F coupled to the right rear support leg 112E and the right front support leg 112G. In one non-limiting example, the horizontal beams 114A-G are coupled to the support legs 112A-G using clamshell brackets. As shown in FIG. 1, the frame 110 may comprise additional support legs 112B, 112D, 112F and additional horizontal beams 114E, 114C, 114G (and may comprise fewer or more, depending upon the size and configuration of the vehicle). For example, as few as three support legs 112 may be used. As shown in FIG. 1, horizontal beams 114C, 114G are only coupled to one support leg 112D, 112G each, respectively. In such a configuration, the corner 115 would be coupled to the ceiling or sidewall of the vehicle. This configuration is ideal when there is a side door entry to the vehicle, allowing for ease of access to the cargo area without a support leg interfering with access.

Figure 2:
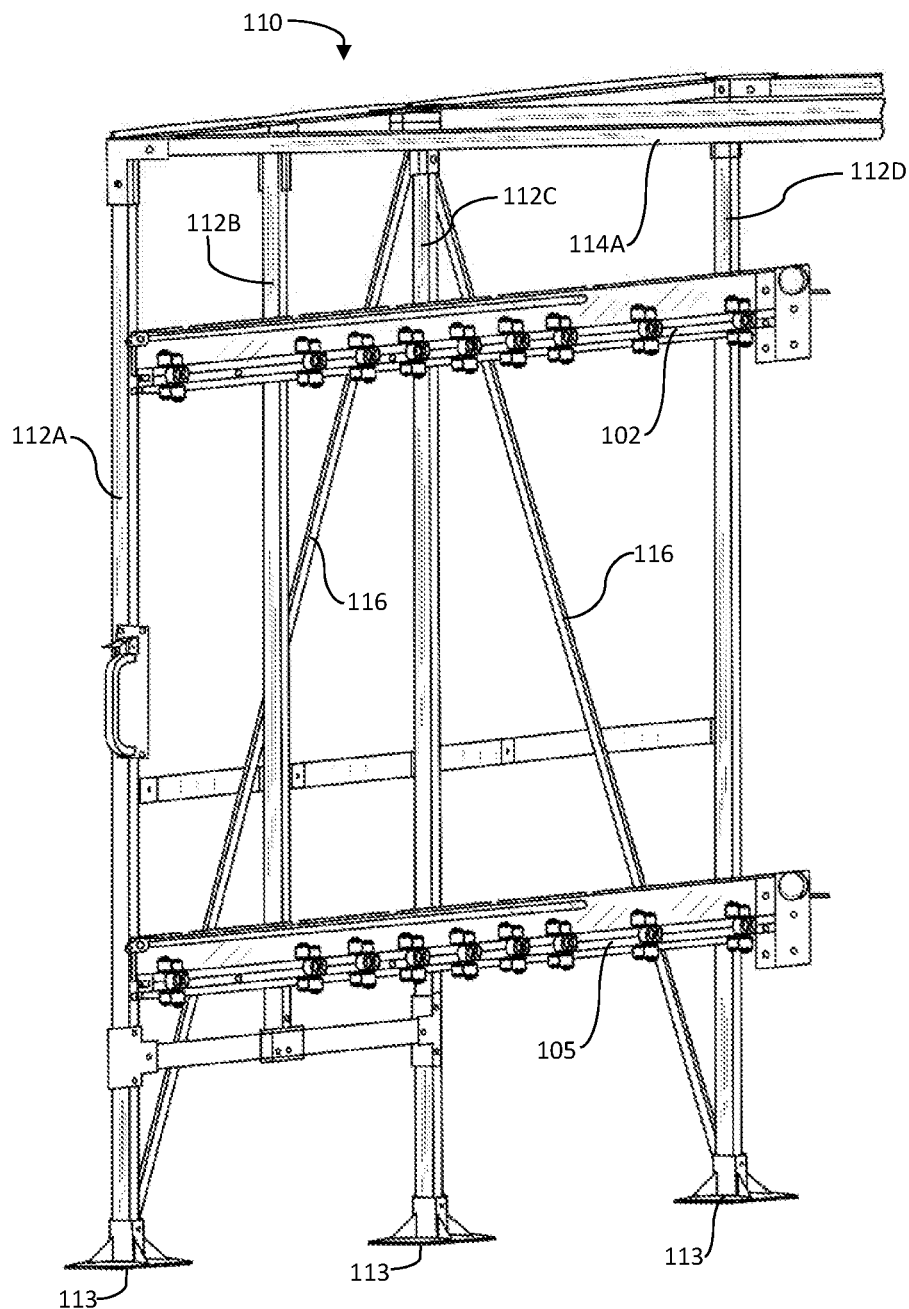
FIG. 2 illustrates one side of a rail system for mounting to a vehicle.
Figure 3:
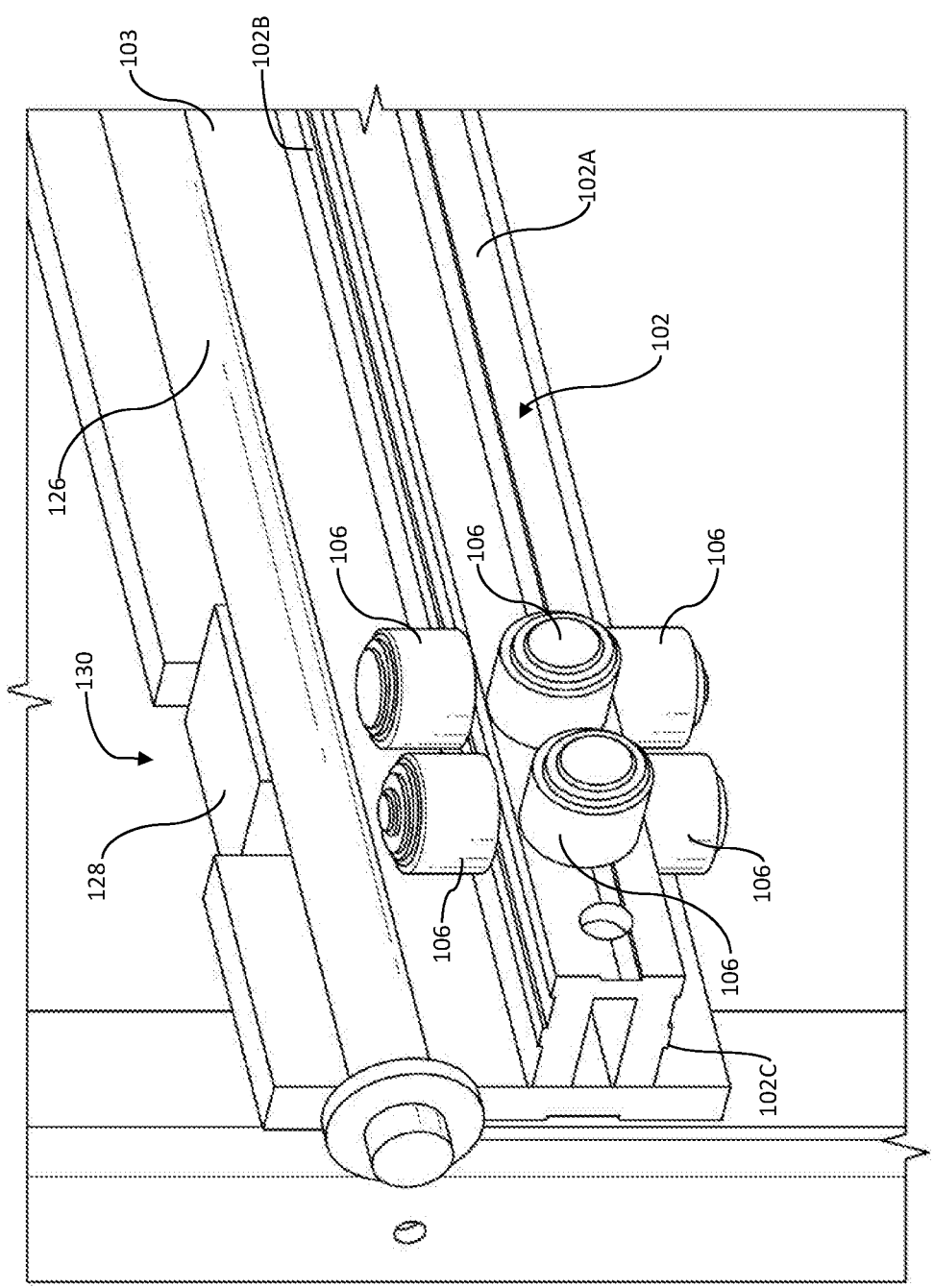
FIG. 3 is a detailed view of bearings on a fixed rail of a rail system for mounting to a vehicle.
Figure 4:
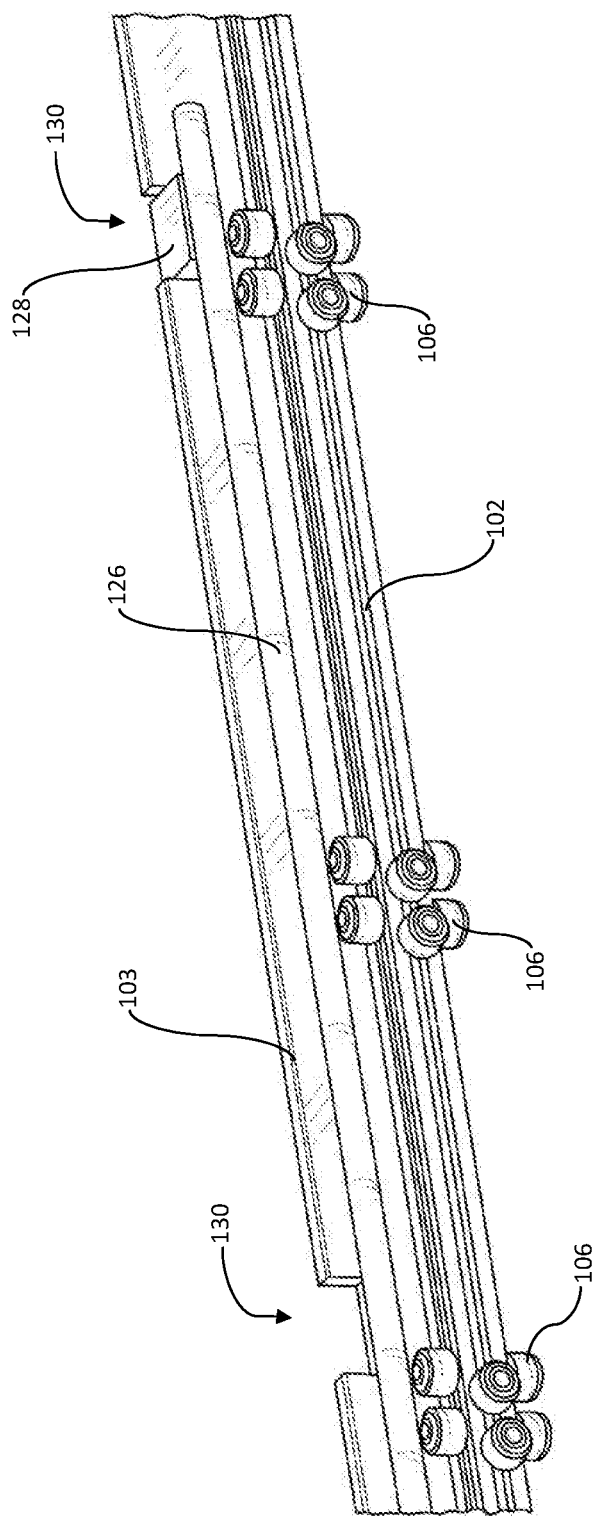
FIG. 4 illustrates bearing clusters on a fixed rail of a rail system for mounting to a vehicle.
Figure 5:
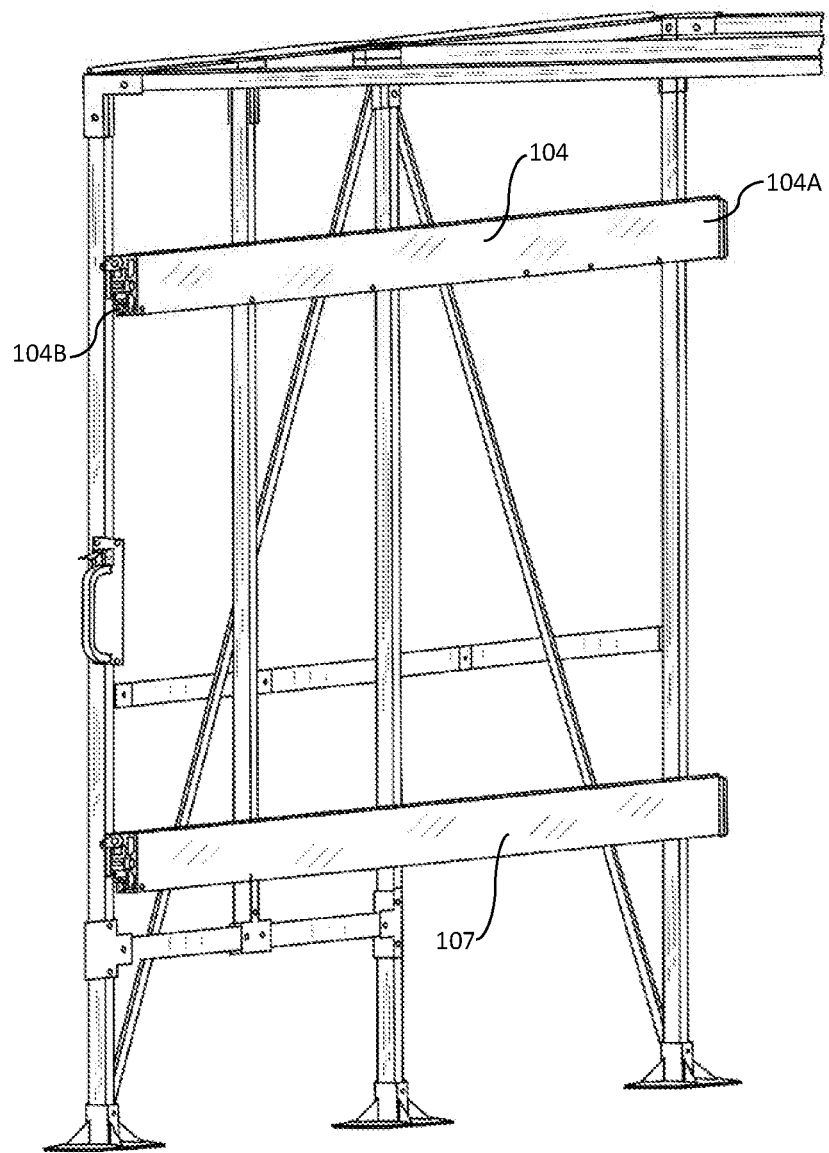
FIG. 5 illustrates one side of a rail system for mounting to a vehicle with sliding rails.
Figure 6:
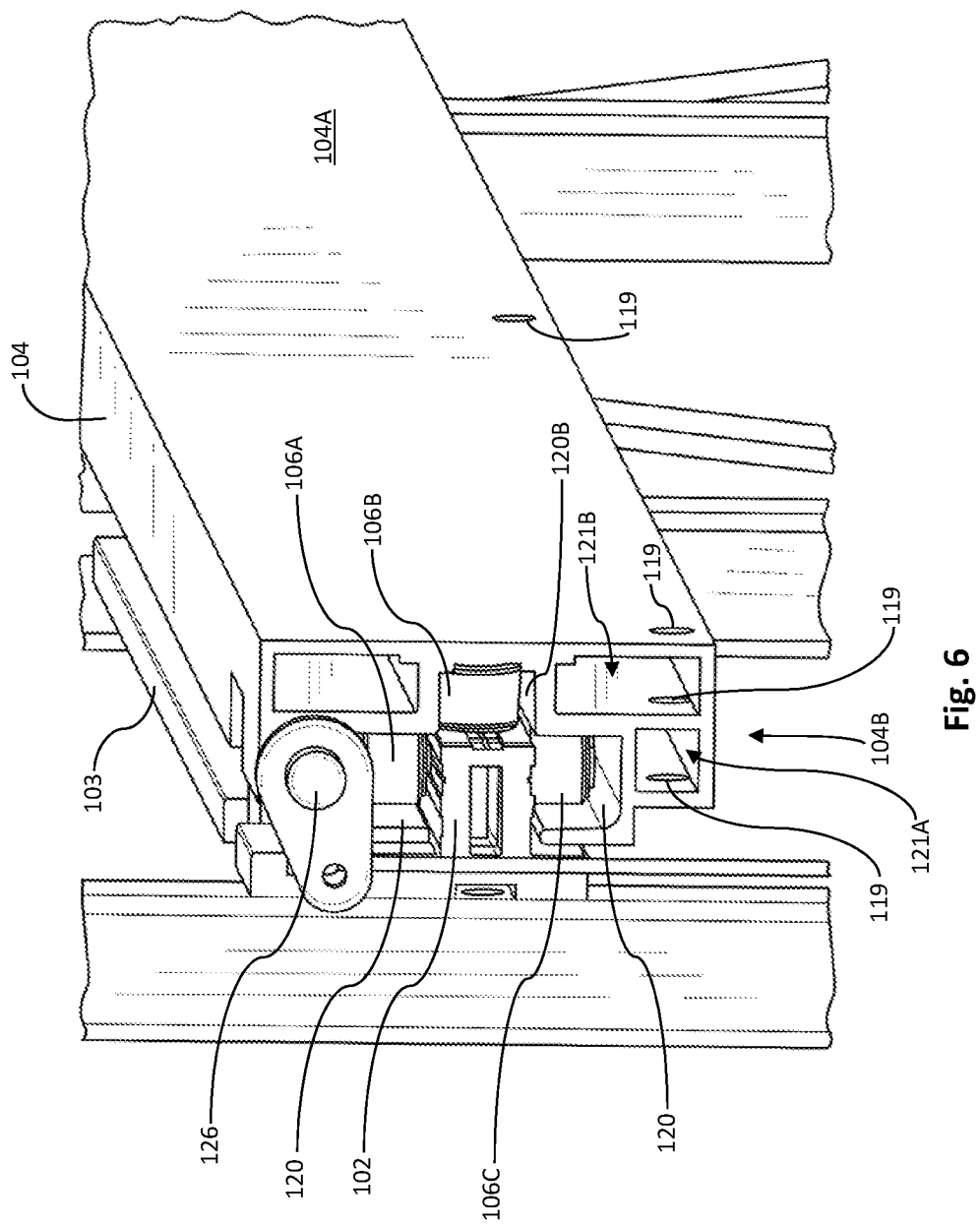
FIG. 6 is an end perspective view of a sliding rail coupled to a fixed rail of a rail system for mounting to a vehicle.
Figure 7:
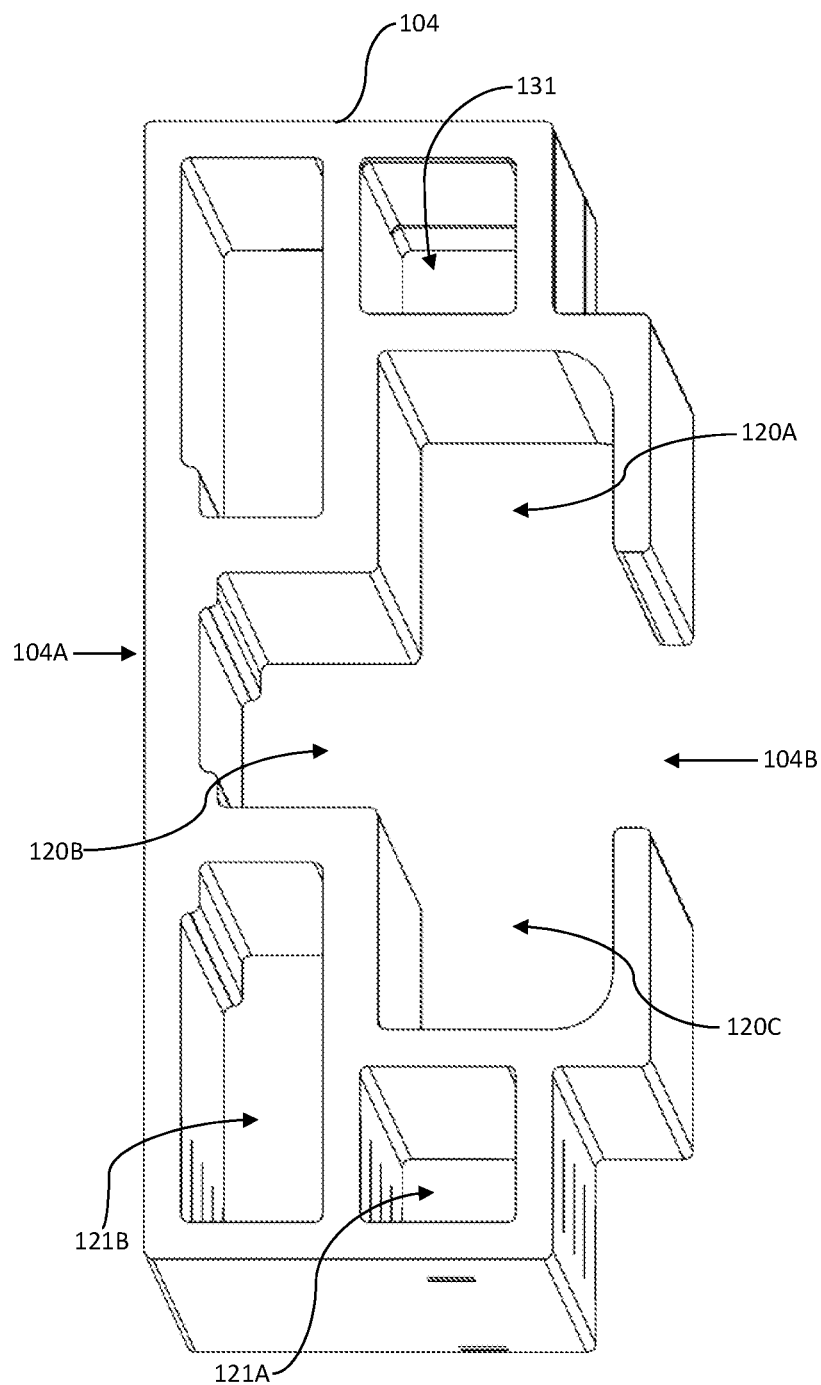
FIG. 7 is a perspective view of a sliding rail of a rail system for mounting to a vehicle.
Figure 8:
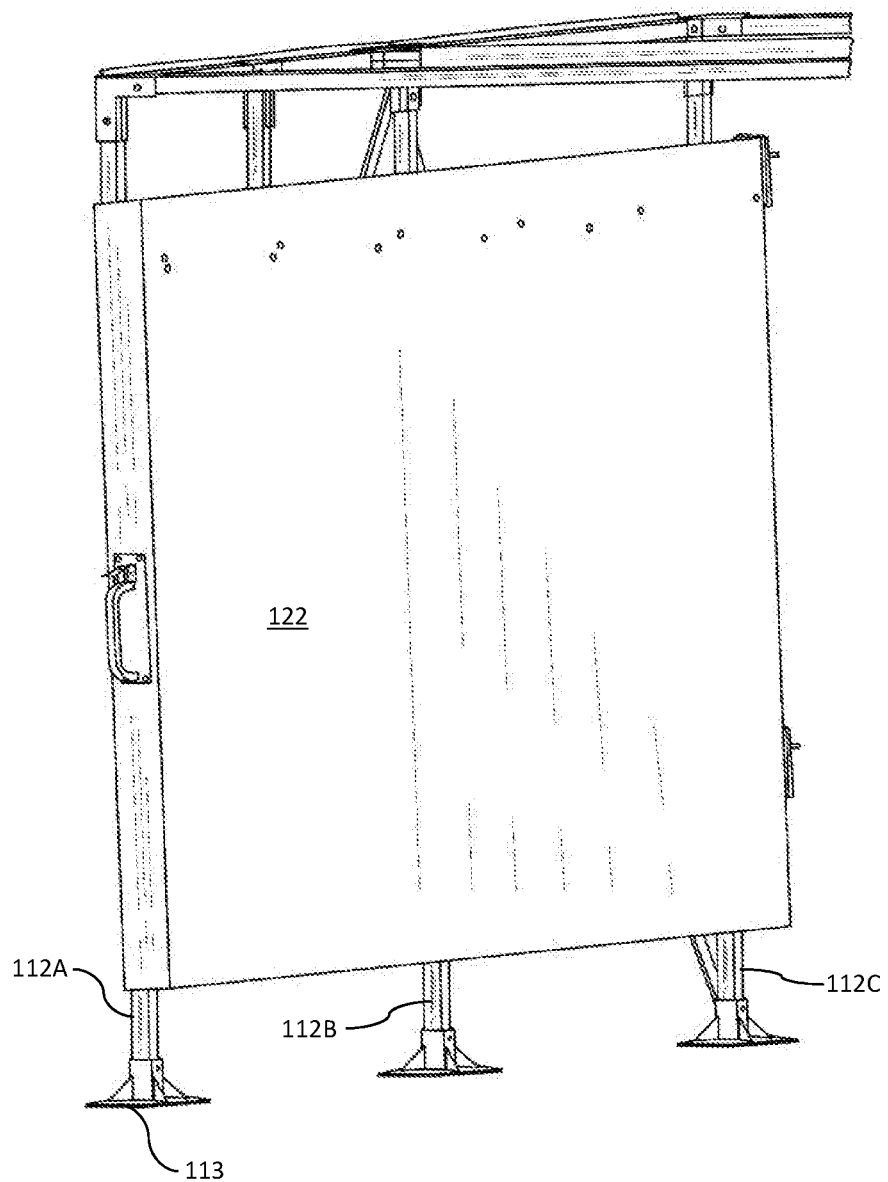
FIG. 8 illustrates one side of a rail system for mounting to a vehicle with a wall panel.

As shown in FIG. 2, the frame 110 further comprises a first (upper) fixed rail 102 mounted to the left rear support leg 112A and left front support leg 112C. As shown in this embodiment, the first fixed rail 102A is further coupled to front corner support leg 112D. As shown in FIG. 3, the first fixed rail 102 comprises inside 102A, top 102B, and bottom 102C faces with a plurality of bearings 106 mounted to each of the front 102A, top 102B, and bottom 102C faces, and a back face with a back plate 103 mounted to the back face. It will be appreciated that the back plate 103 may be integrally formed with fixed rail 102. As shown in FIGS. 2 & 4, the bearings 106 may be configured in clusters along the fixed rail 102. Clustering aids in slidability, weight distribution, and control of the components coupled thereon. Referring back to FIG. 2, a second (lower) fixed rail 105 is coupled to the frame 110 in the same manner as the first fixed rail 102. Second fixed rail 105 is configured in like manner as the first fixed rail 102. As shown in FIGS. 5-7, a first sliding rail 104 engages, and is slidable on, the first fixed rail 102. The first sliding rail 104 comprises a utility side 104A and a groove side 104B. As shown in FIGS. 6-7, the groove side 104B comprises a plurality of grooves 120A-120C for receiving the plurality of bearings 106A-106C coupled to the first fixed rail 102. In other words, the grooves 120A-120C receive bearings 106A-106C, providing for longitudinal movement of the sliding rail 104 in relation to the fixed rail 102. As shown in FIGS. 2 & 5 a second fixed rail 105 is mounted to the left rear support leg 112A and left front support leg 112C, and further to front corner support leg 112D; a second sliding rail 107 is slidable on the second fixed rail 105. As shown in FIG. 8, a wall panel 122 may be coupled to the first and second sliding rails (the rails are not visible, as they are behind wall panel 122). The wall panel 122 may be secured to the sliding rails 104, 107 via bolts, rivets, or other fastening means 117 (FIG. 1). The wall panel 122 may be any type of sheet good, including wood, aluminum, steel, etc. and may be one or more pieces, may be a pegboard, a slat wall, or similar. Likewise, the fixed rails 102, 105 may be fastened to the support legs 112A-C using bolts or similar fastening means, or they may also be welded if a permanent configuration is contemplated.

Referring back to FIG. 1, the frame 110 may comprise additional members, such as bracing members for the purpose of creating additional structural integrity. Such bracing members may be angled members 116 (cross-braces) to prevent lateral or other movement and securing members 118 to prevent any other translational movement.

Figure 9:
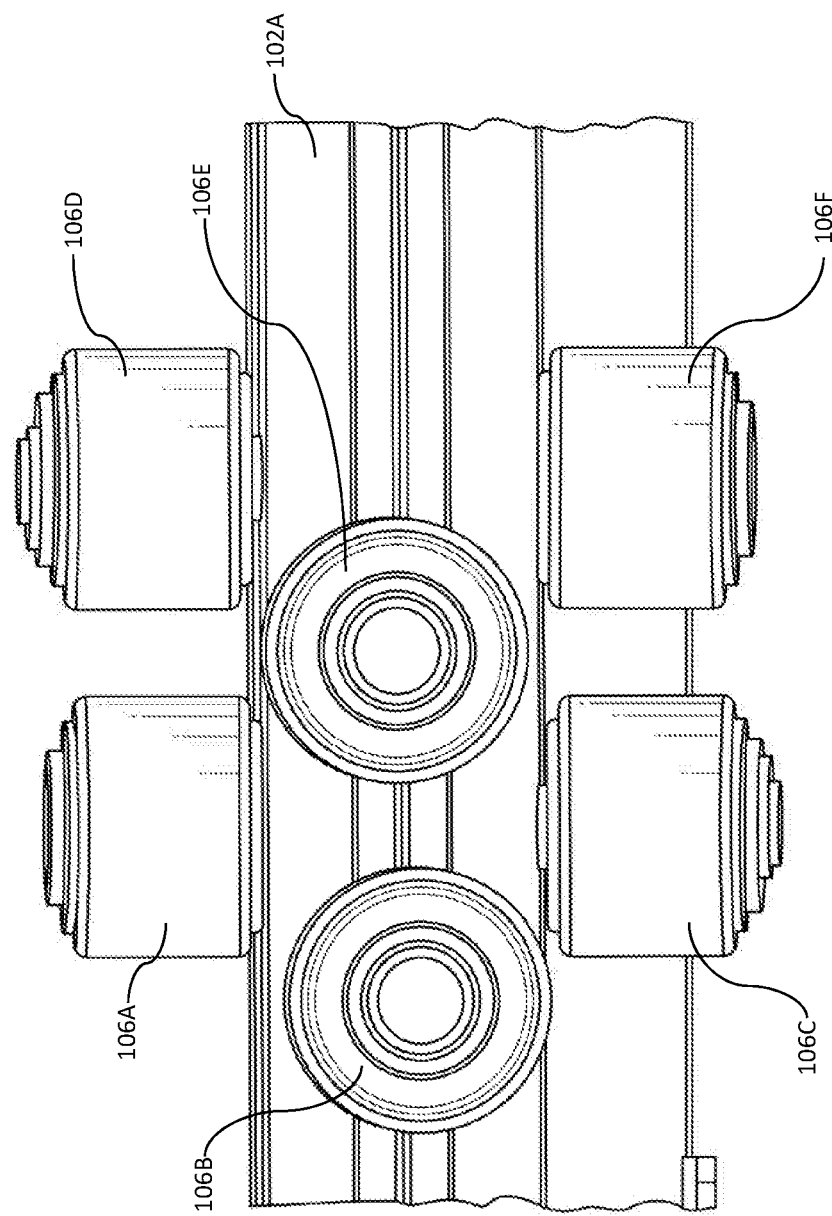
FIG. 9 is a detailed view of bearings on a fixed rail of a rail system for mounting to a vehicle.

Further, as described earlier, and in certain embodiments, the bearings 106 form clusters at intervals along the fixed rail 102. It will be appreciated that each fixed rail may have the same features and configuration, regardless of position on the frame 110. Accordingly, while reference is made herein to fixed rail 102, it will be appreciated that the other fixed rails described and shown herein generally have the same features. FIG. 9 illustrates a cluster of bearings 106A-106F, wherein the bearings 106A-106F are staggered in relation to each other. This allows for smooth rolling, as well as debris release, ensuring that the debris does not prevent the bearings 106A-106F from performing. For example, as shown in FIG. 9, front bearing 106E is positioned slightly higher on the front face 102A than front bearing 106B. In this manner, bearing 106E rides against the upper wall of groove 120B and bearing 106B rides against the lower wall of groove 120B. Likewise, top bearing 106A may be positioned proximal to face 102A and top bearing 106D may be positioned distal to the face 102. As such, top bearing 106A rides on one sidewall of groove 120A, while top bearing 106D rides on the opposite sidewall. The same configuration may be used for bottom bearings 106C, 106F. In the preferred embodiment, the bearings 106A-106F are offset sufficiently such that bearings configured to ride in the same groove (e.g., 106A and 106D ride in groove 120A) engage opposite sidewalls of the groove simultaneously. As further illustrated in FIG. 9, the bearings 106A-106F may be separated from one another by a distance. In one embodiment, the distance of separation between the bearings 106A-106F is less than the diameter of a bearing 106A-106F. In another embodiment, the distance between bearings 106A-106F is greater than the diameter of a bearing 106A-106F. While the bearings 106A-106F are illustrated as being in clusters of six, it will be appreciated that as few as one bearing 106 per face 102A-102C is required. By utilizing a two-rail system (fixed rails 102, 105 and sliding rails 104, 107) on each side of the frame 110, each rail 102, 105 having a plurality of bearings 106 located about the length thereof, an enormous amount of weight can be placed on the panel 122 without compromising the rails (either the fixed or the slidable). As discussed above, the bearings 106 are preferably placed at regular intervals of the fixed rails 102, 105. This unique placement not only allows for smooth rolling of the sliding rails 104, 107, but also creates additional support, which, surprisingly, allows the vehicle rail system 100 to support more weight than the manufacturer recommends be loaded into a vehicle. As such, the vehicle rail system 100 with the plurality of bearings 106 placed at regular intervals far outperforms anything in the prior art. Further, such a rail system allows the wall panel 122 to be fully extended from the vehicle, which also overcomes limitations of the prior art.

Figure 13:
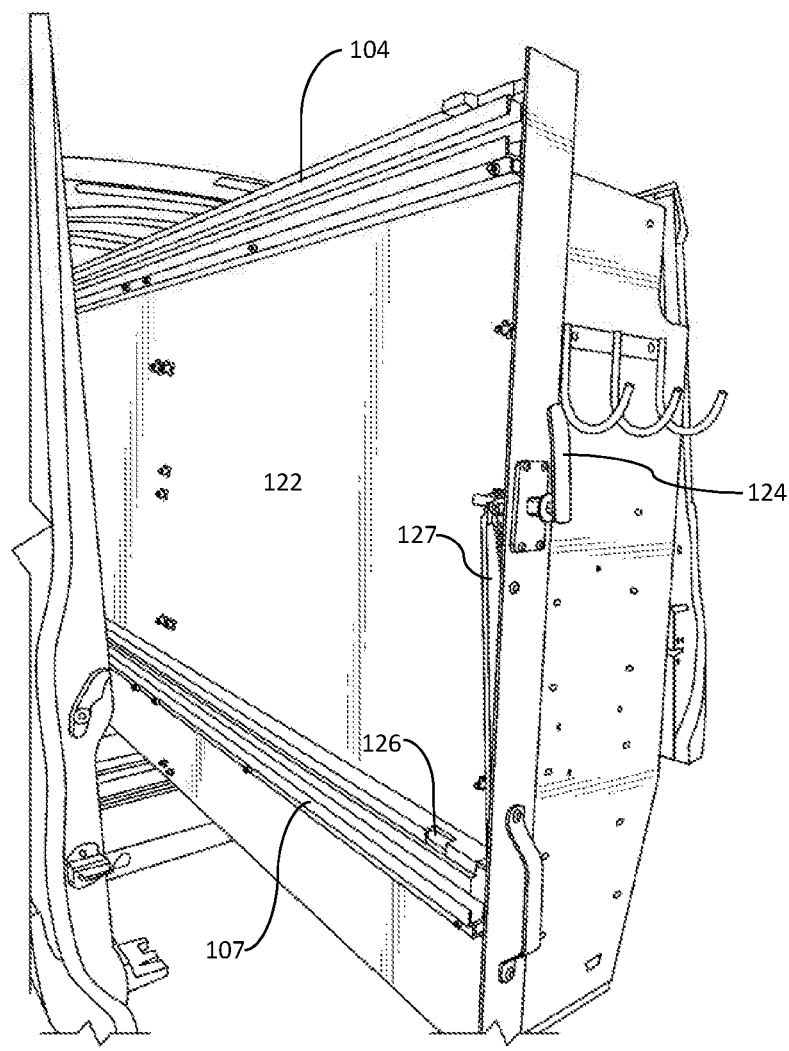
FIG. 13 is a back view of a wall panel of a rail system for mounting to a vehicle extended from the cargo area of a vehicle.
Figure 14:
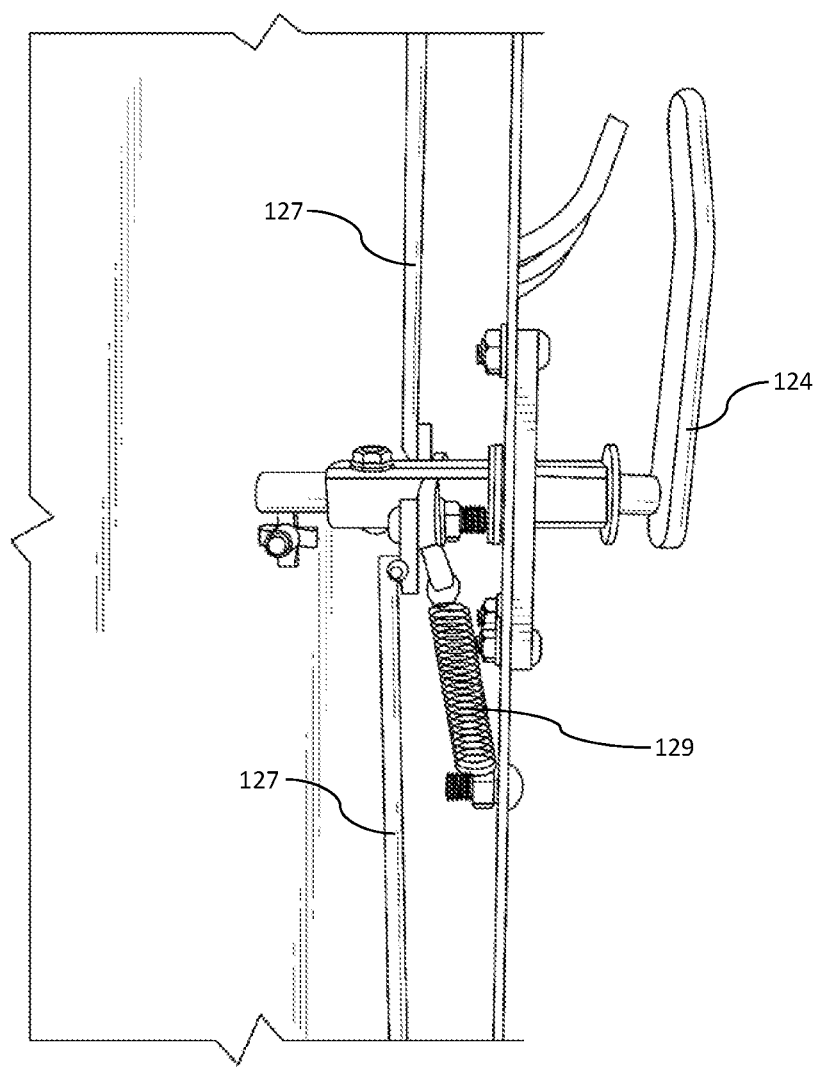
FIG. 14 is a detailed view of a handle for actuating a locking mechanism of a rail system for mounting to a vehicle.
Figure 15:
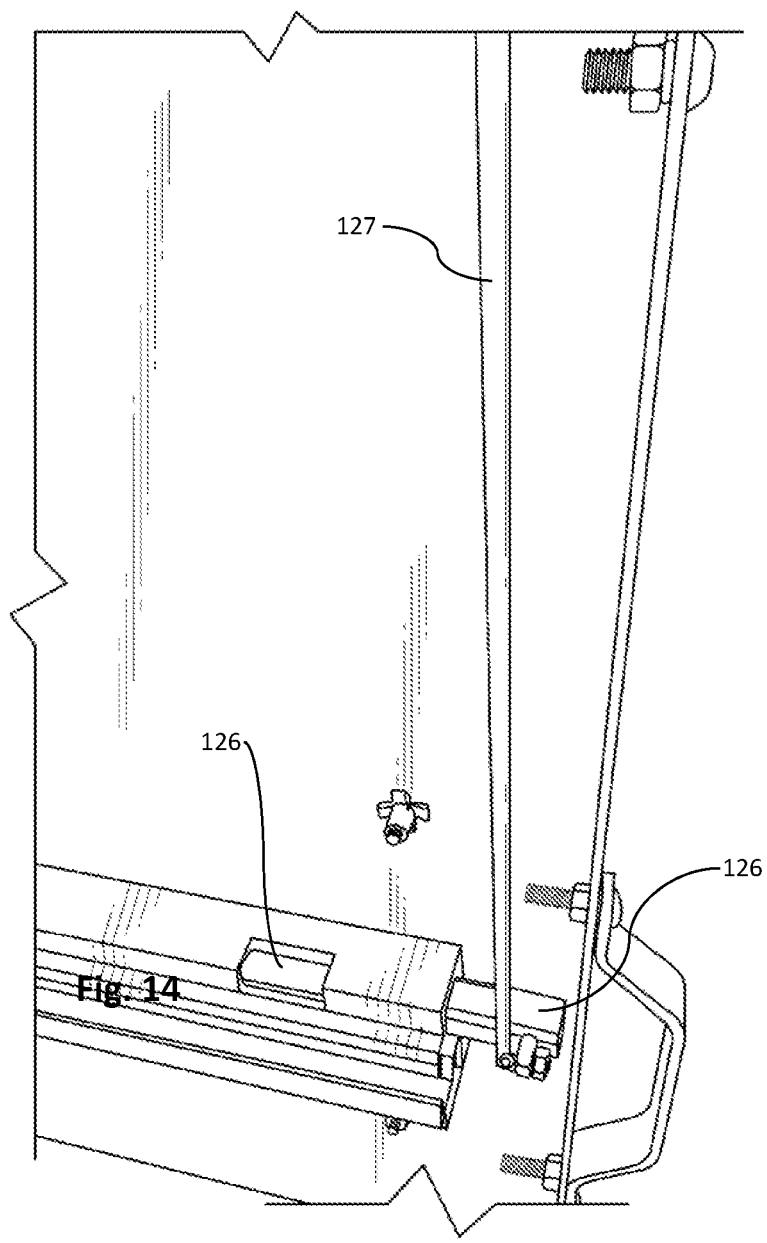
FIG. 15 is a detailed view of a locking mechanism of a rail system for mounting to a vehicle.

Because such an enormous amount of weight can be placed on the sliding rail assemblies (comprising a sliding rail slidable on a fixed rail), a locking system may be used to lock the sliding rails 104, 107 when fully-stowed, fully-extended, and at various intervals in-between. Referring to FIGS. 3-4, a locking system comprises a rotatable rod 126 and a locking tab 128 thereon for mating with a locking aperture 130 at the user-preferred extended length. As shown in FIG. 4, a plurality of locking apertures 130 are available on the back plate 103 of the fixed rail 102 so that a user may lock the sliding rails 104, 107 at a desired extended length. FIG. 1 also illustrates the locking apertures 130 on the fixed rails, with the locking tab 128 engaged in the locking aperture 130 proximal to the support leg 112G. Referring to FIGS. 13-15, a handle 124 may be spring-loaded and may control one or more rotatable rods 126 when actuated by a user. For example, a user would actuate handle 124, which, in this example, would vertically displace actuator rods 127, the rods 127 being perpendicularly coupled to the rotatable rod 126 such that the rotatable rod 126 is correspondingly rotated (parallel to the fixed rail), which disengages the locking tab 128 from its current locking aperture 130. The user may then slide the sliding rail 104 to a new position, where the locking tab 128 engages a new locking aperture 130. In a spring-loaded example, the locking tab 128 would be forced into the next locking aperture 130, via the spring 129 biasing the handle 124 back into its original position, causing the locking tab 128 to remain in the engaged position, if a user does not maintain the handle 124 rotated. This is beneficial, as it reduces or eliminates the ability of the wall panel 122, which may be extremely heavy, from sliding out of a vehicle if a user cannot support the weight. For example, if the vehicle is parked on an incline, with the wall panel 122 extending from the rear of the vehicle on a decline, it may be difficult for a user to prohibit the wall panel 122 from fully extending. Accordingly, the locking tabs 130 allow the user to extend the wall panel 122 at set intervals so as to prohibit full-extension of the wall panel 122. It will be appreciated that while manual actuation of the rotatable rod 126 is used in this example, the rotatable rod may also be electronically actuated. Further, the rod 126 passes through a rod channel 131 (see FIGS. 6-7) in the sliding rail 104.

Referring to FIG. 6, the wall panel 122 (not shown in this view) is mounted to the sliding rail 104 using bolts, rivets, or other fastening means secured through securing apertures 119. Accordingly, the sliding rail 104 has at least one channel 121A, 121B for receiving the rivets so that the rivets do not interfere with the bearings 106 when the wall panel 122 and accompanying sliding rails 104, 107 are coupled to the fixed rails 102, 105.

Figure 10:
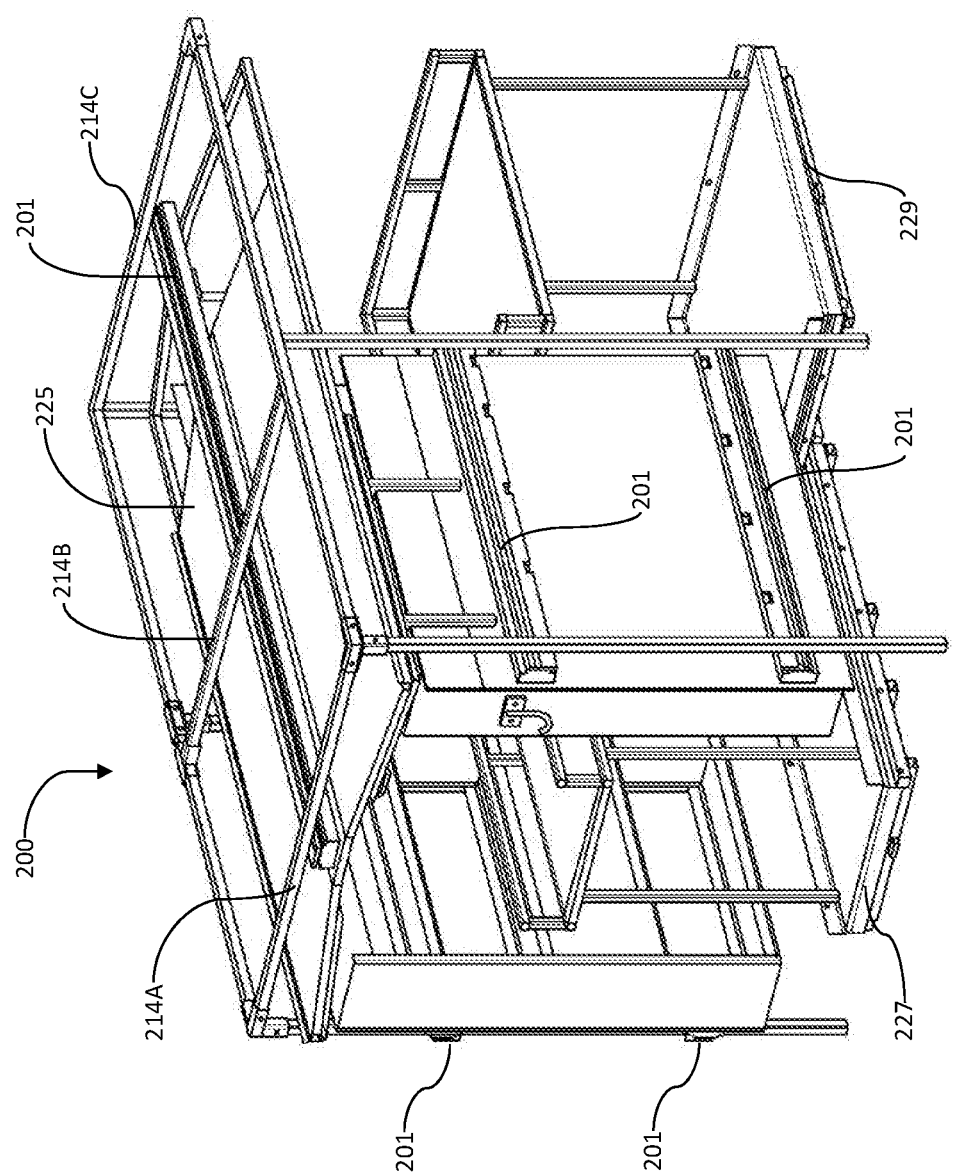
FIG. 10 is a perspective view of a rail system for mounting to a vehicle having a canopy.
Figure 11:
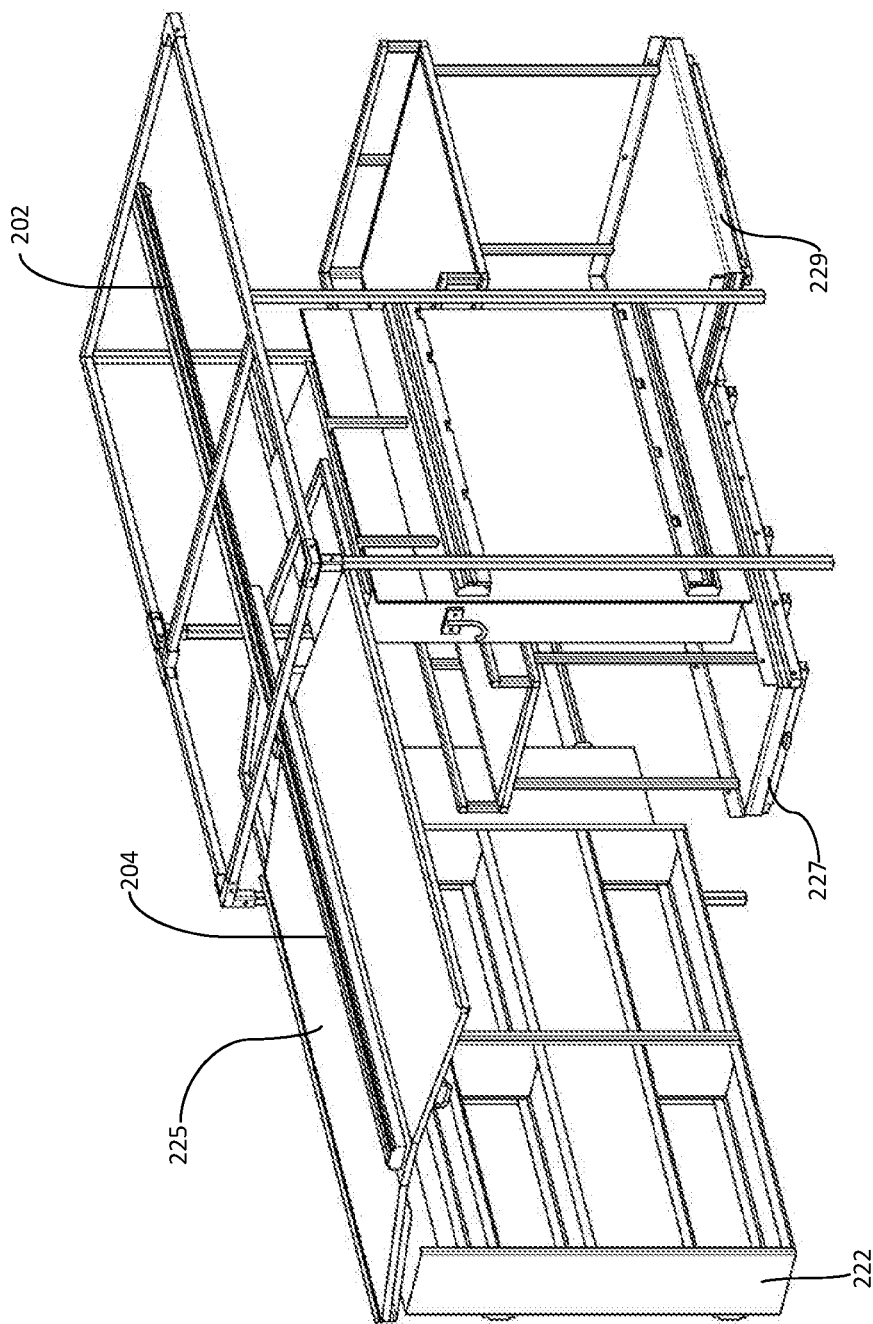
FIG. 11 is a perspective view of a rail system for mounting to a vehicle with several components extended.
Figure 12:
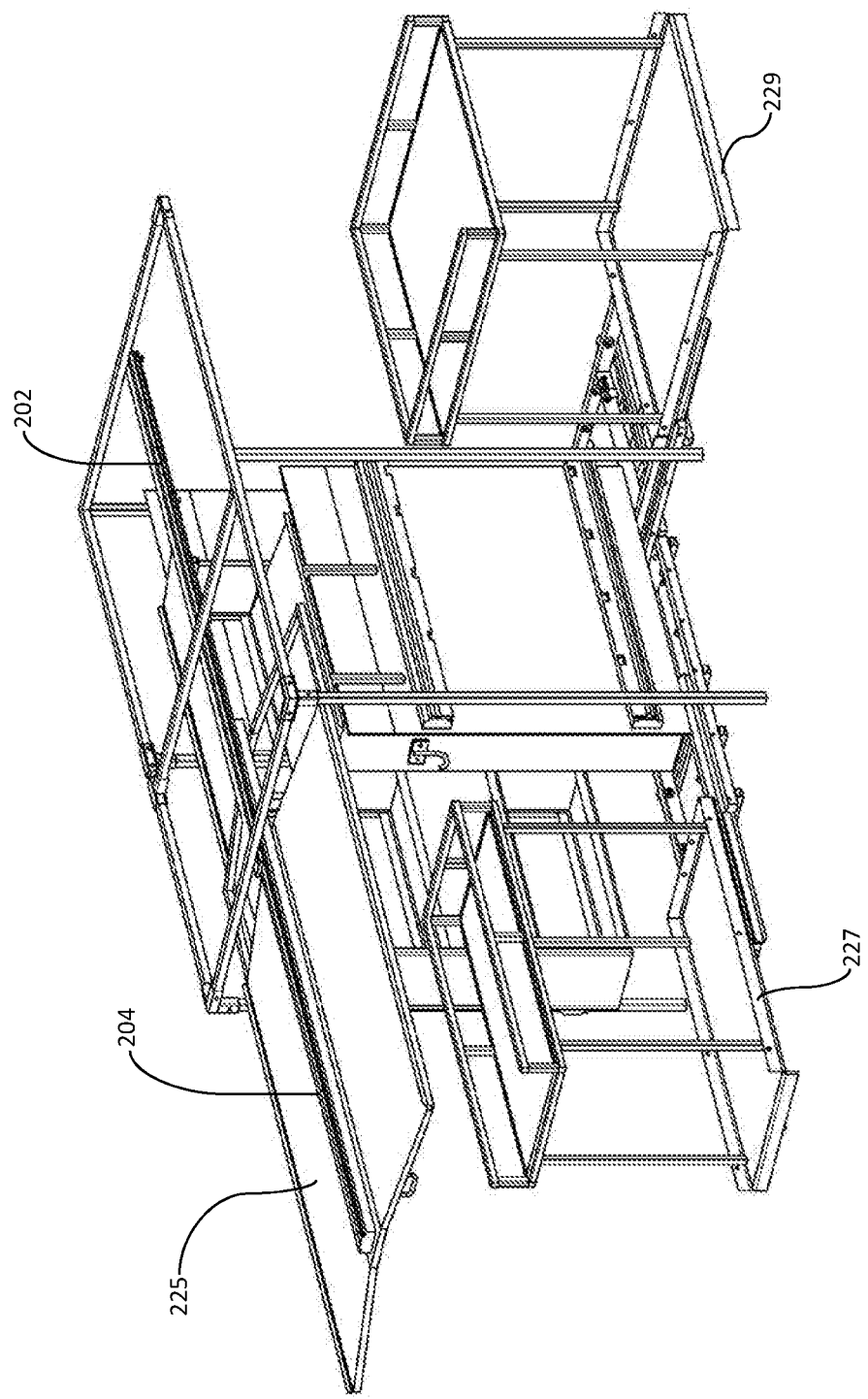
FIG. 12 is a perspective view of a rail system for mounting to a vehicle with several components extended.

FIGS. 10-12 illustrate an embodiment of a rail system 200 for mounting in a vehicle, comprising a left side having at least two sliding rail assemblies 201, each assembly comprising a fixed rail and a sliding rail; a right side having two sliding rail assemblies 201; a ceiling sliding rail assembly 201 mounted to horizontal beams 214A, 214B, 214C; and a canopy 225 coupled to the ceiling sliding rail assembly 201 (which comprises the same components, namely top fixed rail 202 and top sliding rail 204 (as seen in FIG. 11)). As illustrated, additional sliding rail assemblies may be used for floor shelving units 227, 229. As appreciated from these figures, each component may be individually extended using the sliding rail assemblies 201. For example, FIG. 10 illustrates all components retracted, or stored in position (e.g., within the cargo area of a vehicle when rail system 200 is mounted therein). FIG. 11 illustrates a first wall panel 222 with shelving thereon extended as well as canopy 225 extended. It will be appreciated that the canopy 225 protects the worker and/or cargo from weather. FIG. 12 illustrates the canopy 225 extended, along with floor shelving units 227, 229. As appreciated, shelving unit 229 extends perpendicularly and is meant to exit a side door of a vehicle cargo area. It will be appreciated that the sliding rail assemblies 201 are ideally of the same configuration as earlier embodiments described herein. However, it will also be appreciated that other bearing systems may be used that are known in the art, and that the use of such systems does not depart herefrom, and that the use of other bearing mechanisms on a frame system 110 for mounting within a vehicle is contemplated herein.

Figure 16:
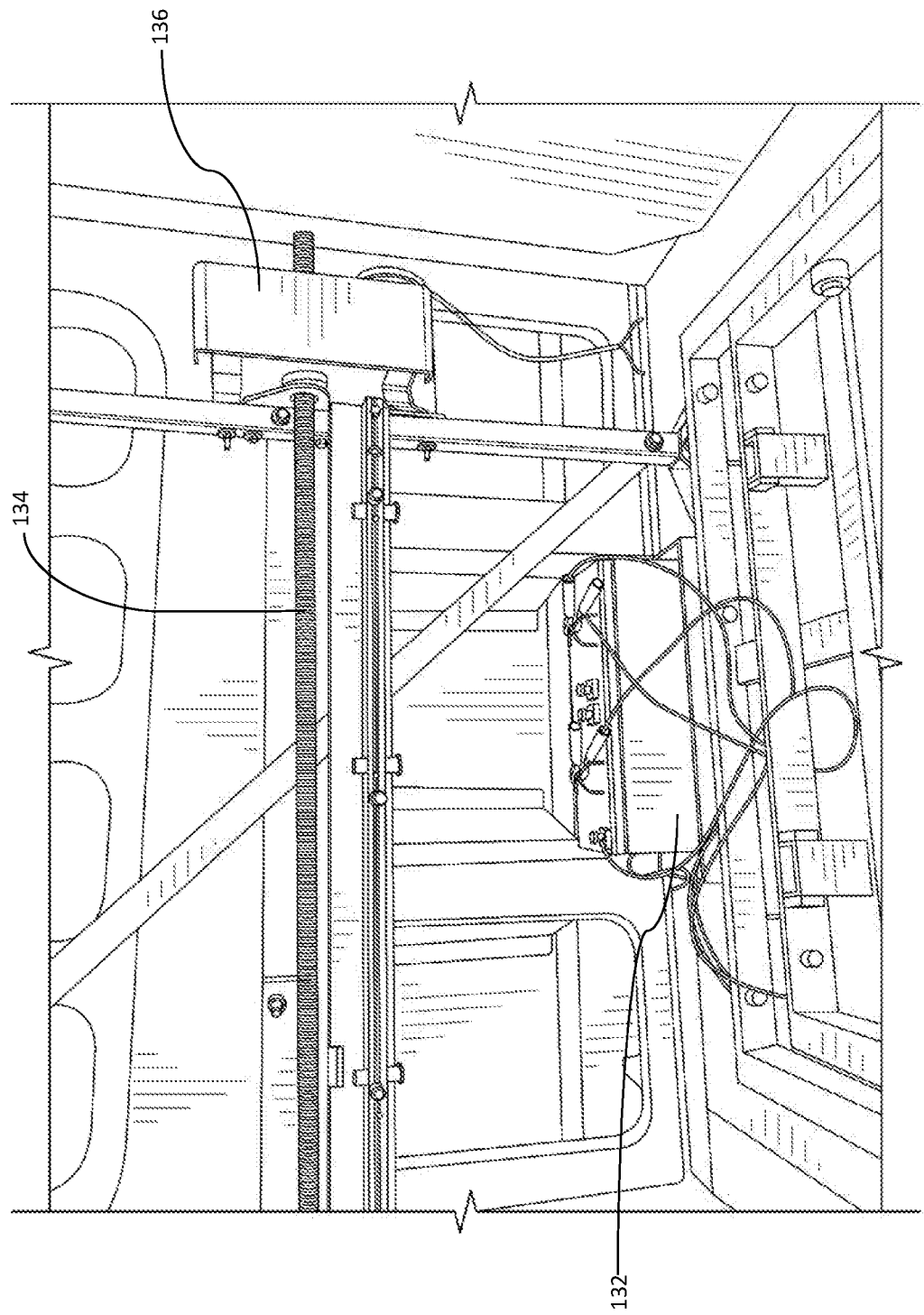
FIG. 16 is a view of motor components for controlling a wall panel of a rail system for mounting to a vehicle.
Figure 17:
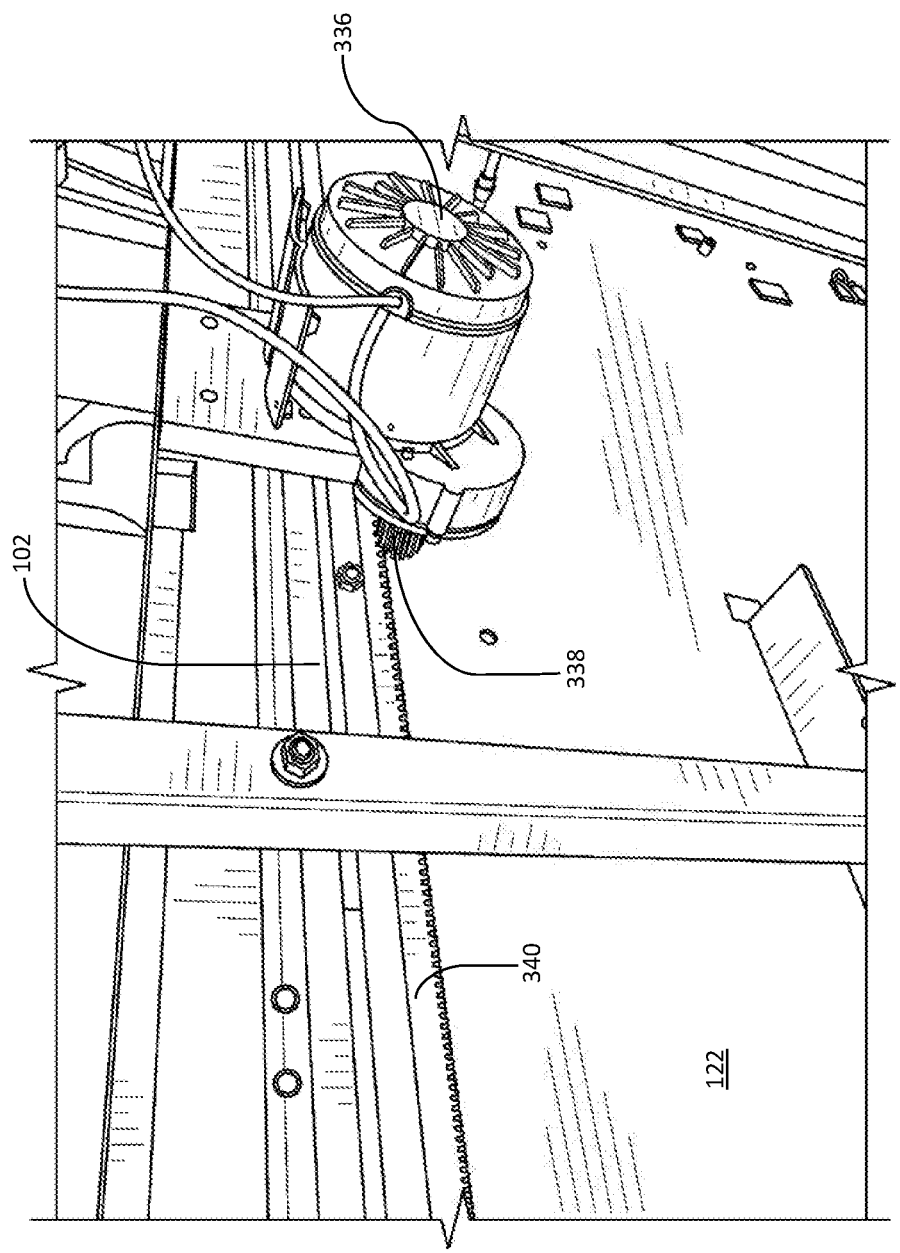
FIG. 17 is a view of motor components for controlling a wall panel of a rail system for mounting to a vehicle.
Figure 18:
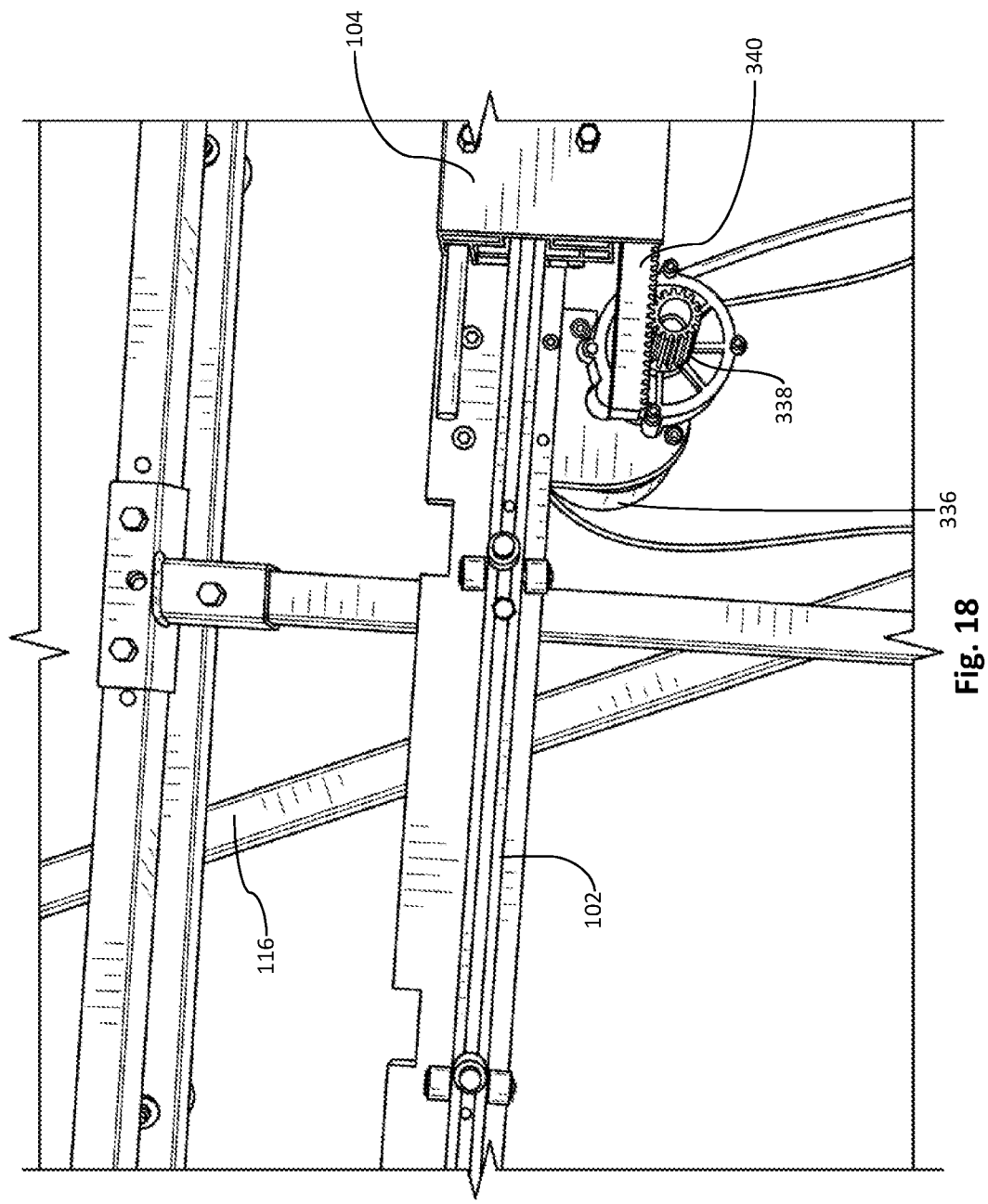
FIG. 18 is a view of motor components for controlling a wall panel of a rail system for mounting to a vehicle.

Because of the surprising amount of weight that can be placed on the vehicle rail system 100, 200, a power-driven vehicle rail system may be ideal in some scenarios. As such, FIGS. 16-18 illustrate a motor-driven vehicle rail system. In FIG. 16, the motor-driven vehicle rail system comprises a power source 132 (e.g., one or more auxiliary batteries, crank battery, alternator, etc.) and a standard electrical motor 136, the motor 136 driving a threaded bolt 134, which displaces the wall panel 122 and sliding rails coupled thereto. As such, a user may extend or retract the sliding rails 104, 107 into the vehicle using power. As appreciated, the motor 136 may be controlled using a wired switch, wireless switch, and the like. Such a feature is extremely beneficial when extending or retracting on an incline, or when simply moving heavy items. The motor 336 may be an electric motor or, in further embodiments, a stepper motor. As shown in FIGS. 17-18, the motor 336 may be attached to the frame 110 or one of the fixed rails 102. In particular, as illustrated, the motor 336 may be attached to the upper fixed rail 102. The drive mechanism may also comprise a pinion gear 338 attached to an output shaft of the motor 336. The drive mechanism may further comprise a linear rack 340 that is attached to the corresponding sliding rail—in the illustrated embodiment, upper sliding rail 104. The rack 340 may extend along generally the entire length of the sliding rail 104. In this manner, the motor 336 may be used to drive the wall panel 122, which may be extended for its entire length. It will be appreciated that other methods of powered, linear actuation may be used, including a chain drive, belt drive, hydraulics, or others.

Figure 19:
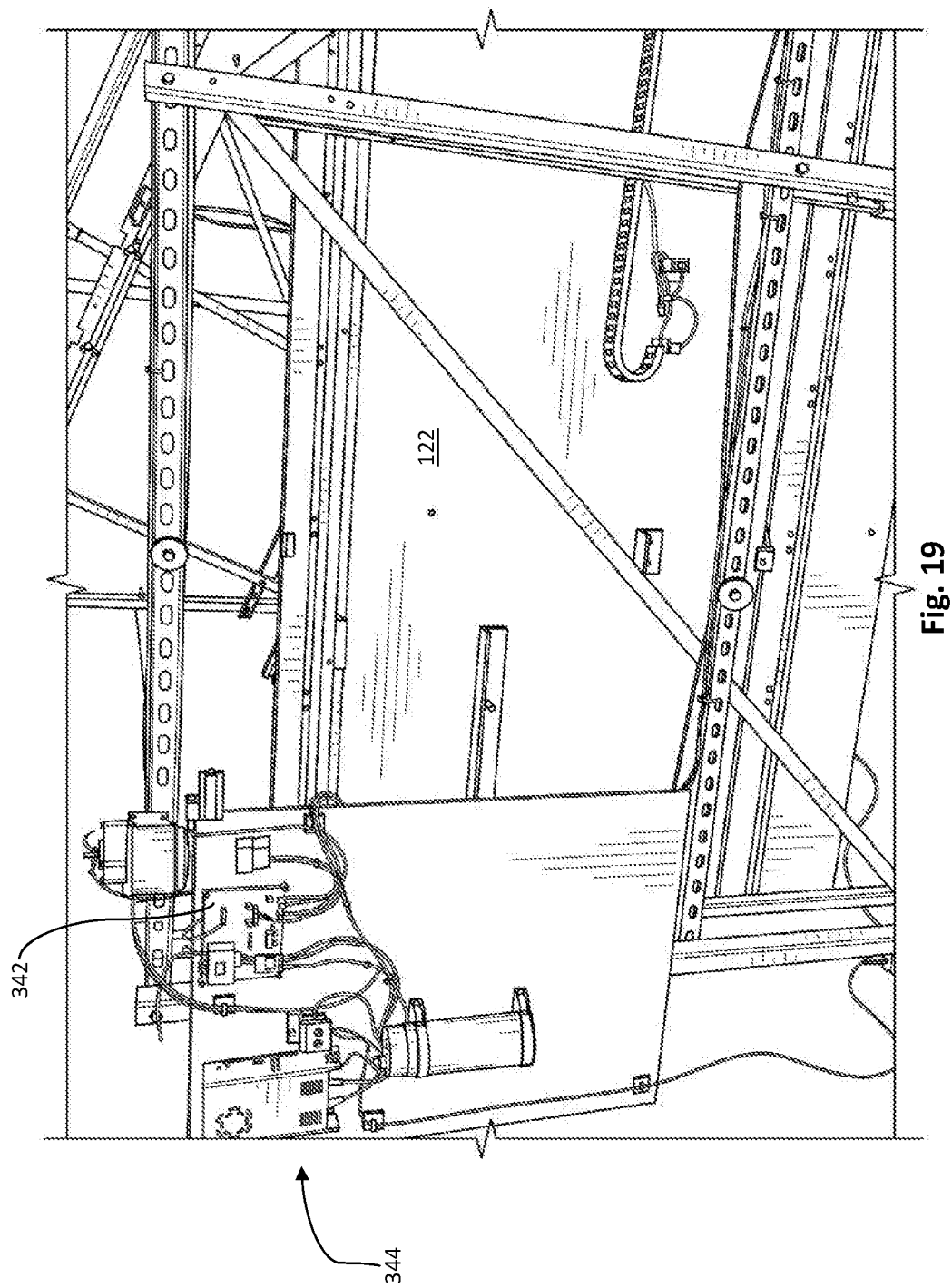
FIG. 19 is a view of motor components for controlling a wall panel of a rail system for mounting to a vehicle.

As shown in FIG. 19, the drive system may further comprise a drive control system 344, including a motor controller 342. The motor controller 342 communicates with the motor 336 (FIGS. 17-18) and may include programmable logic that allows the motor 336 to adjust its speed and torque to accommodate the weight carried by the wall panel 122 as well as the angle of the vehicle. For example, if the wall panel 122 is carrying a heavier load, the motor controller 342 may cause the motor 336 to apply greater torque to the pinion 338, and if the wall panel 122 is carrying a lighter load, the motor controller 342 may cause the motor 336 to apply lower torque. In this manner the speed of the wall panel 122 may be maintained relatively constant independent of the load being carried. In addition, the motor controller 342 may compensate for the angle of the vehicle, including providing braking to prevent the wall panel 122 from extending too quickly if the vehicle is parked on an uphill slope, such that the wall panel 122 exits the vehicle downwardly down the hill.

The motor controller 342 may be further configured to allow the user to extend the wall panel 122 by some length less than the full extension of the wall panel 122. For example, the user may be provided with a remote control, whether wired or wireless, that allows the user to select the degree of extension. In certain embodiments, the remote may include one or more buttons that allow the user to extend to various degrees of extension corresponding to the user's selection. For example, the user may select a first position, and the motor controller 342 would then cause the motor 336 to drive the wall panel 122 to a first position. Alternatively, the user may select a second position, and the motor controller 342 would then cause the motor 336 to drive the wall panel 122 to a second position. The motor controller 342 may include logic or be programmed to control the acceleration and deceleration of the wall panel 122 so that it accurately extends to the desired position.

Figure 20:
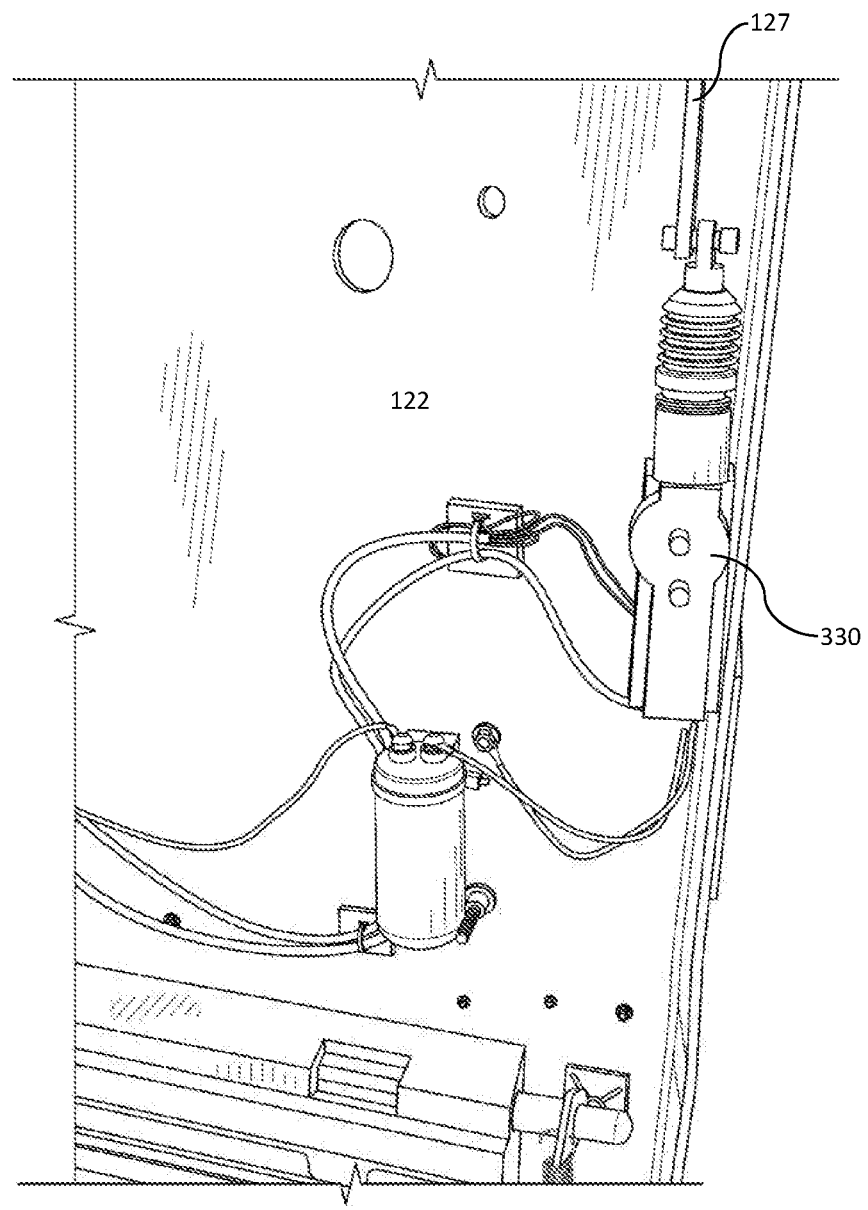
FIG. 20 is a view of an electronic actuator for controlling a locking tab of a rail system for mounting to a vehicle.

In a further embodiment, the locking tab system, described earlier, may be adapted for use with a motorized drive mechanism, as shown in FIG. 20. An actuator rod 127 extends from an actuator 330 and is coupled (e.g., using a lever) to the rod 126 with locking tab 128. In the illustrated embodiment, the actuator 330 is an electrical linear actuator. The actuator rod 127 is pivotally connected to the actuator 330 and rod 126. In this manner, the up and down linear movement of the actuator 330 is translated into rotational movement of the rod 126, thereby allowing the actuator 330 to rotate the rod 126 and move the locking tab 128 in and out of engagement with the locking apertures 130.

The locking tab 128 may be remotely or automatically actuated and may be controlled by the motor controller 342 or electronic components or hydraulics acting in conjunction with the motor controller 342. As described above, the locking system may comprise a rotatable rod 126 received within a rod channel 131 of a sliding rail 104. The rod 126 may have a locking tab 128 attached thereon for mating with a locking aperture 130 in the corresponding fixed rail 102. In alternative embodiments, rotation of the rod 126 may be controlled in conjunction with the motorized drive mechanism 344. For example, the user may select extension of the wall panel 122 to a first position on the remote control. The drive control system 344 then actuates rotation of the rod 126 removing the tab 128 from the aperture 130 or the current position. While the locking tab 128 is held out of engagement, the motor controller 342 causes the motor 336 to drive the wall panel 122 to the desired position. Once the wall panel 122 is at or near the desired position, the drive control system 344 releases the rod 126, which allows the locking tab 128 to rotate and engage the locking aperture 130 corresponding to the desired position.

As earlier described, the rod 126 may include a spring 129 or other biasing element that allows the locking tab 128 to automatically engage the next available locking aperture 130 in the event of power loss, thereby automatically locking the position of the wall panel 122. The rod 126 may be actuated by a variety of rotary or linear actuators as would be understood by one of ordinary skill in the art, including electric, pneumatic or hydraulic actuators. In certain embodiments, the rod 126 may be actuated by a rotary actuator. In other embodiments, the rod 126 may be actuated by a linear actuator using a cam or lever.

Figure 21:
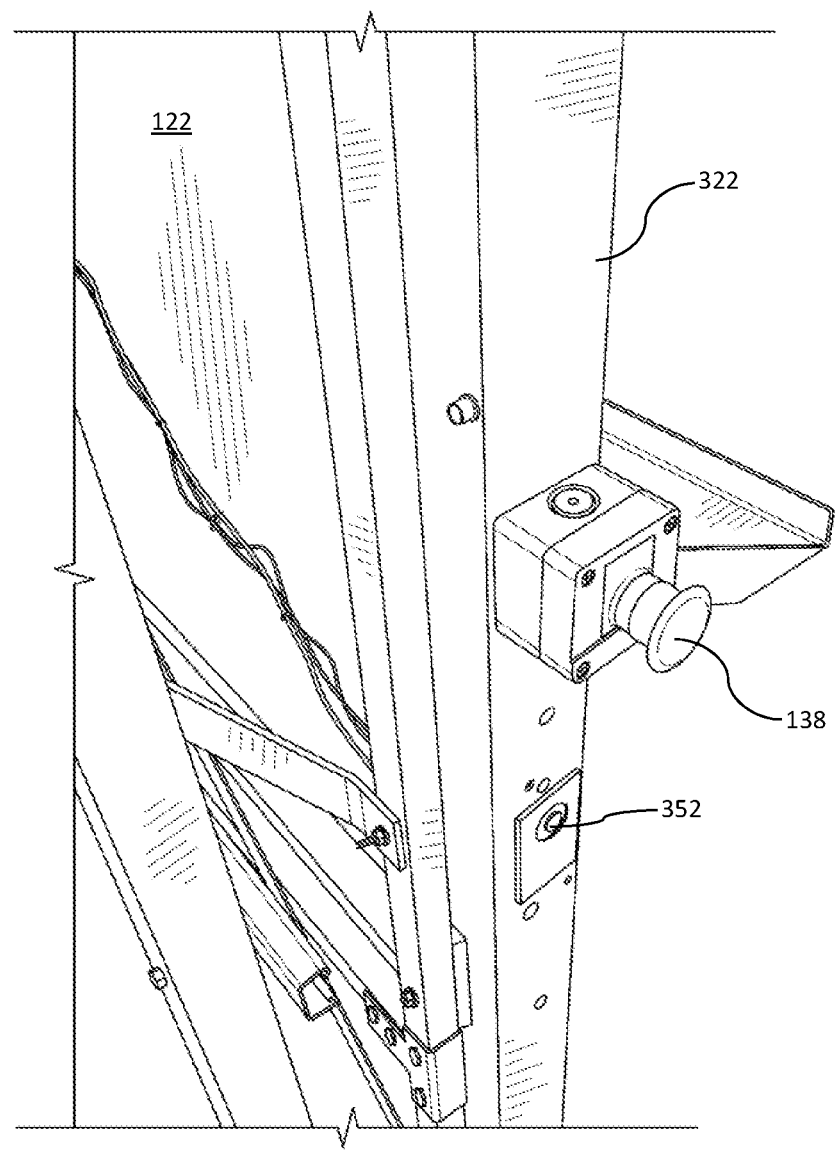
FIG. 21 is a view of a back section of a wall panel of a rail system for mounting to a vehicle.

As shown in FIG. 21, a portion of the wall panel 122 may extend at a right angle to the main portion of the wall panel 122, creating a flat back section 322 that is generally parallel to the back of the vehicle and perpendicular to the direction of movement of the wall panel 122. In the illustrated embodiment, a proximity sensor 352 is mounted to this back section 322. The sensor 352 is connected for communication with the drive control system 344. When the sensor 352 detects an object in the path of the wall panel 122, the drive control system 344 may take a variety of different actions, alone or in combination, to prevent the wall panel 122 from contacting or damaging the object, including stopping the motor 336, reversing the motor 336, and releasing the rod 126 so that locking tab 128 can engage a locking aperture 130. In addition to the proximity sensor 352, the wall panel 122 may include a contact switch 138 (i.e., emergency shut-off button). The contact switch 138 may operate in communication with the drive control system 344 as described with respect to the proximity sensor 352. Alternatively, the contact switch 138 may act as an override switch that cuts power to the drive mechanism 344.

For example, when the sensors 352 determine that an object is within a predetermined distance from the back section 322 of the wall panel 122, the motor controller 342 may engage a braking system (e.g., electric brake), or the motor 136, 336 may be deactivated or the drive reversed. This is an important safety feature. Other accessories may be added, such as a lighting system, which may be operated by a switch.

Figure 22:
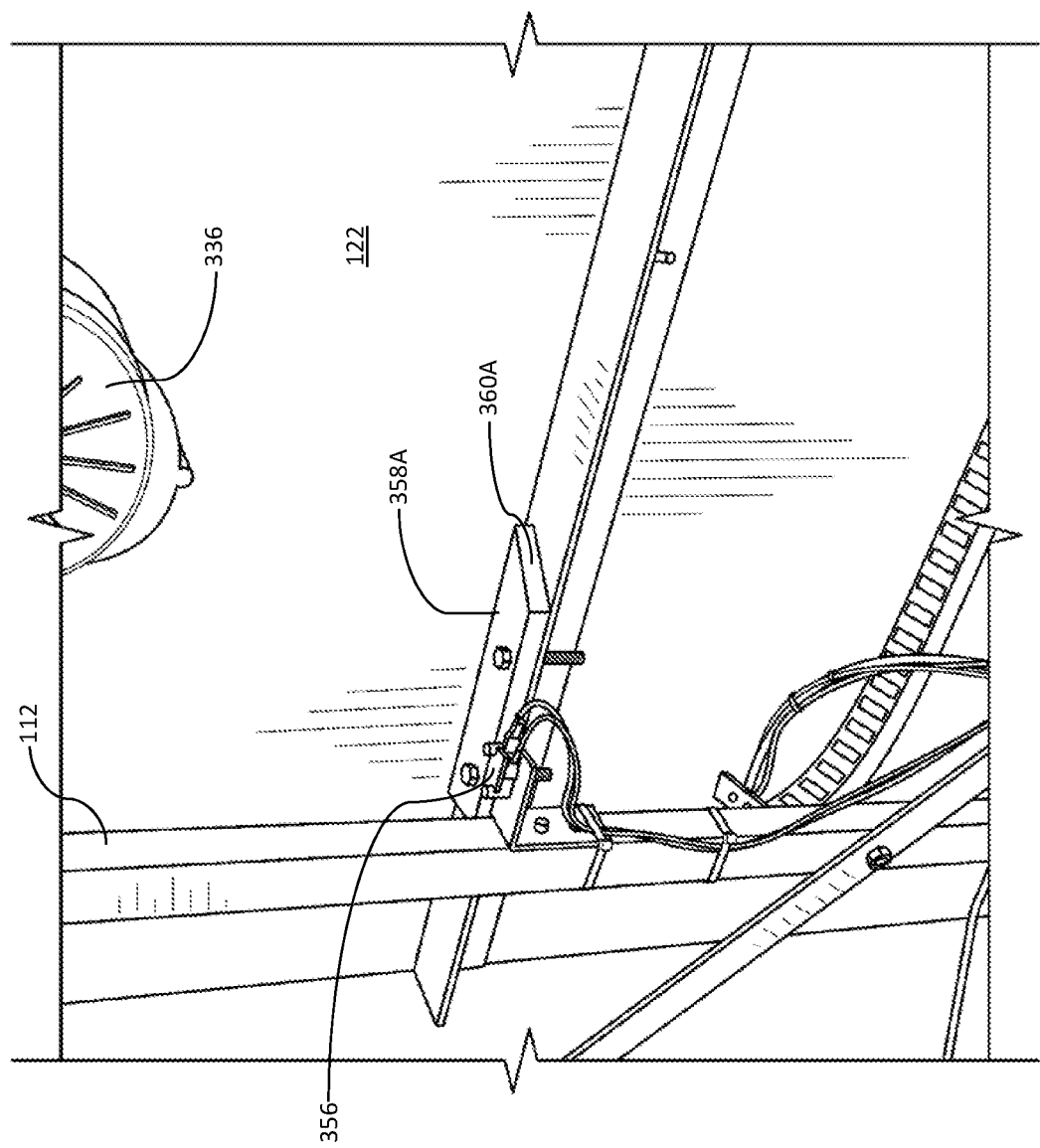
FIG. 22 illustrates the back side of a wall panel of a rail system for mounting to a vehicle, comprising sensors to slow and stop the movement of the wall panel.
Figure 23:
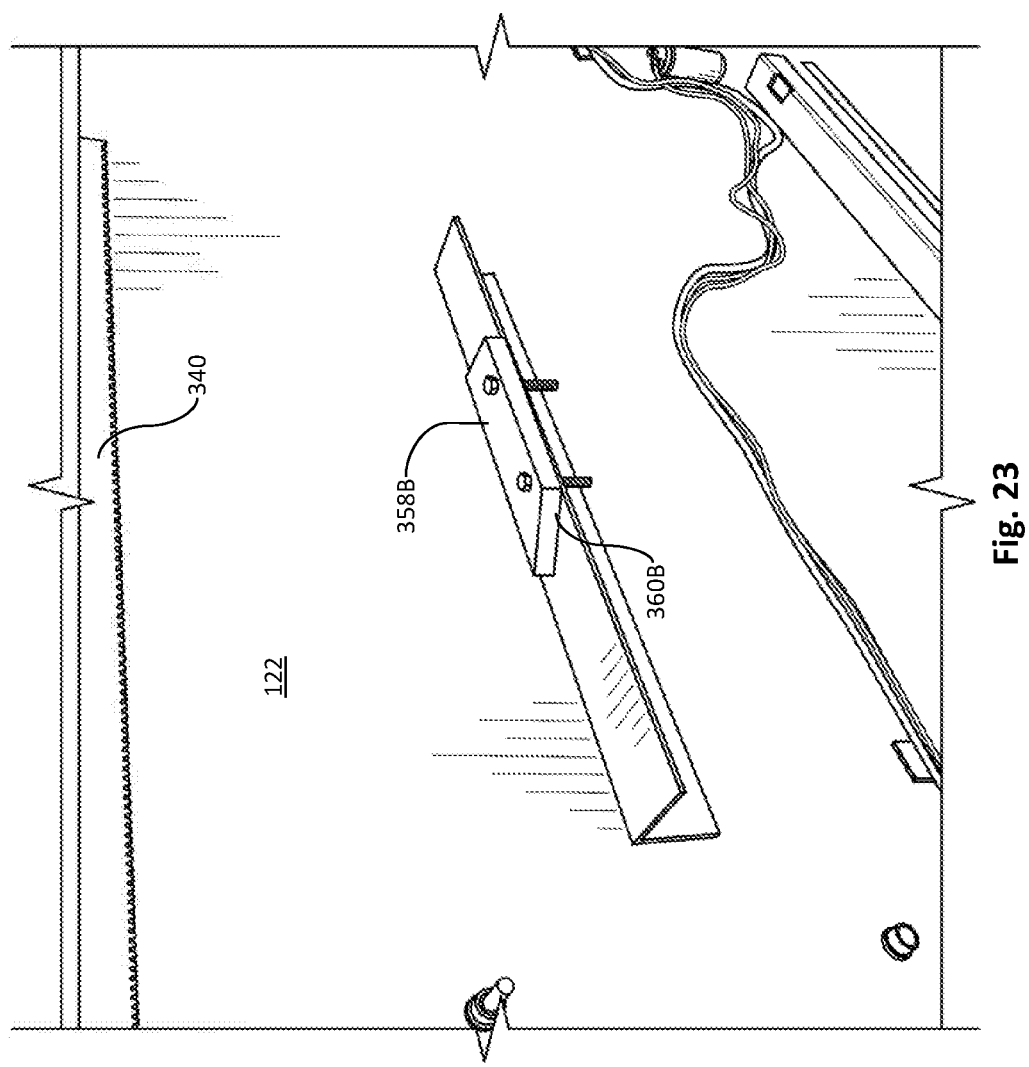
FIG. 23 illustrates the back side of a wall panel of a rail system for mounting to a vehicle, comprising sensors to slow and stop the movement of the wall panel.

Embodiments of the drive control system 344 may further include sensors that provide information to the drive control system 344, indicating that the wall panel 122 has reached, or is reaching, the end of its travel, thereby allowing the drive system to slow the wall panel 122 before it hits a hard limit on its travel. For example, as shown in FIGS. 22-23, embodiments of the drive system may include a sensor 356 mounted to the support leg 112. The drive system may further comprise blocks 358A-B attached to the wall panel 122 and spaced apart such that the blocks 358A-B are adjacent to the sensor 356 at opposite ends of the wall panel 122 travel. The sensor 356 may be a proximity sensor or a contact sensor. If the sensor 356 is a contact sensor, it may include a lever or follower that contacts a surface of the blocks 358A-B. The blocks 358A-B may include an angled surface 360A-B that provides progressive engagement or actuation of the sensor 356. In other words, as the wall slide 122 is fully-extended, the lever of sensor 356 is actuated when contacting block 358A. The angled portion 360A may slow the speed, with the motor 336 being stopped when the lever of the sensor 356 is fully engaged to the block 358A, as shown in FIG. 22. Likewise, when the wall panel 122 is retracted within the vehicle, surface 360B slows the motor 336 and the block 358B fully stops the motor 336.

Figure 24:
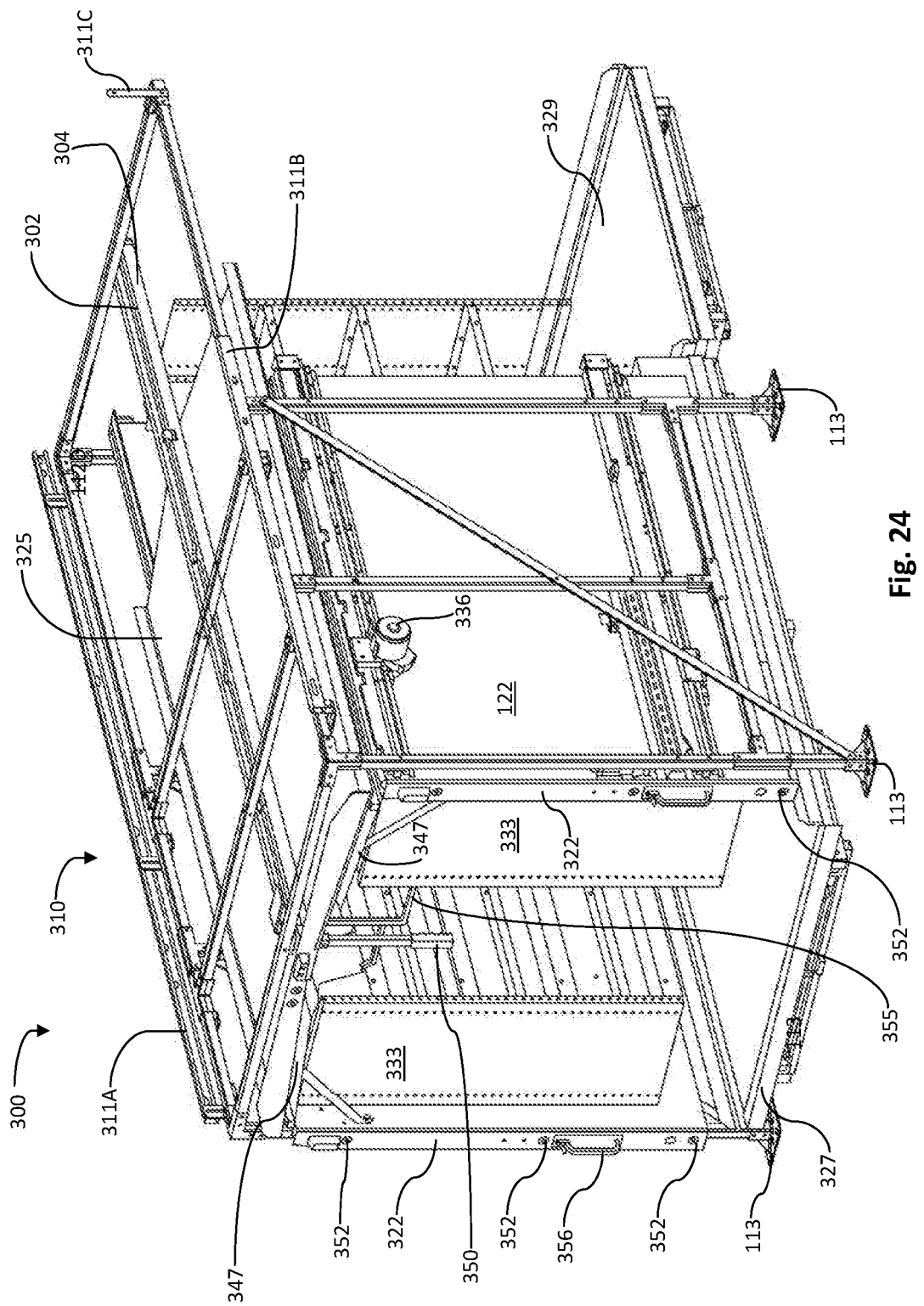
FIG. 24 is a perspective view of a rail system for mounting to a vehicle.
Figure 25:
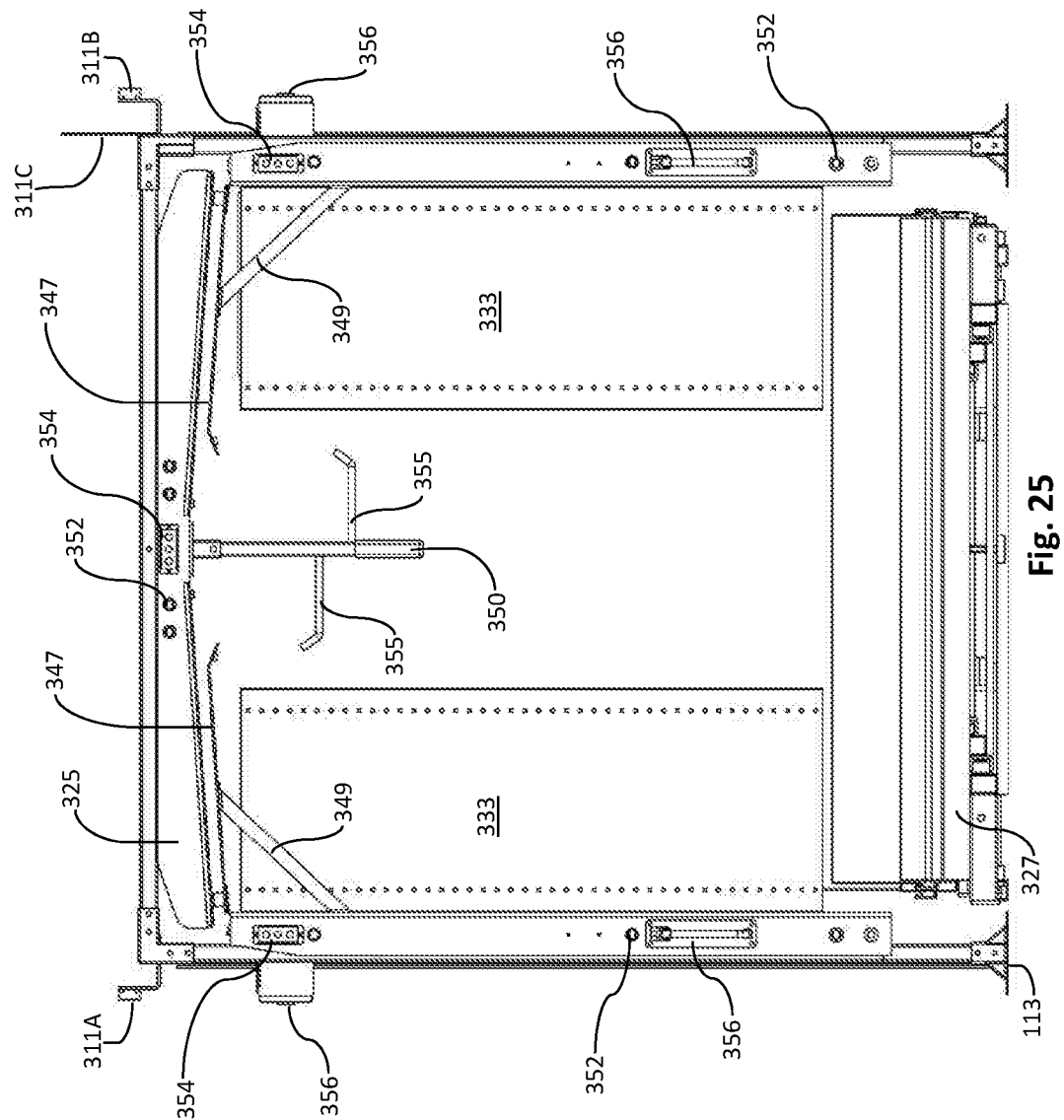
FIG. 25 is a rear elevation view of a rail system for mounting to a vehicle.

FIGS. 24-25 illustrate an embodiment of a vehicle rail system 300 for mounting in a vehicle. As shown, frame 310 is adapted for mounting to the cargo area of a vehicle using base plates 113 and frame mounting rails 311A-C. As illustrated, the one or more wall panels 122 are motor-driven, using motor 336. The back section 322 comprises one or more proximity sensors 352. The wall panels 122 have shelving 333 coupled thereto, providing for easy storage of items on each extendable wall panel 122. A canopy 325 is mounted to a ceiling-fixed rail assembly, which comprises a ceiling-fixed rail 302 and a sliding rail 304 slidable on the ceiling-fixed rail 302. The sliding rail 304 and canopy 325 are extendable to the exterior of the vehicle. It will be noted that the ceiling-fixed rail 302 may be mounted to the ceiling of the vehicle either directly or by using one or more brackets. In a non-limiting example, in an effort to avoid adverse weather conditions, a user may extend the canopy 325, where the canopy 325 may shield both the user and any items thereunder. If the vehicle is equipped with a wall panel 122 (as shown in FIG. 24), the canopy 325 may extend independently of the wall panel 122. Other components may also have a canopy. For example, each wall panel 122 may further comprise individual shelving canopies 347 so that the contents on the shelving 333 may be shielded without requiring the use of the overhead canopy 325, should a user desire. For example, the shelving canopy 347 may be coupled to the wall panel 122 using one or more canopy brackets 349. The shelving canopy 347 may be an elongated panel manufactured from a number of materials, including aluminum, stainless steel, carbon fiber, or other sturdy material that is preferably weather resistant. The shelving canopies 347 are ideally sized so as to cover shelving 333. Because the shelving canopies 347 are coupled to the wall panel 122, they do not move independently of the shelving 333. Referring back to the overhead canopy 325, it will be appreciated that the size of the overhead canopy 325 may be wide enough to shield one or more wall panels 122, but it may also be narrower in size. Further, the canopy 325 may also utilize the locking tab system previously disclosed herein, and may further have an extension handle 350 for easy movement of the canopy 325. The canopy 325 may also have one or more hooks 355 descending therefrom, providing the user with the ability to hang items, such as ladders or other equipment. Having a canopy 325 extendable from within a vehicle to shield a working site solves shortcomings in the prior art. As appreciated from the current disclosure, a user may now not only shield himself, but may also shield his cargo when extended outside the vehicle. The canopy 325 also functions to create a covered worksite as well. As with the wall panels 122, the canopy 325 may also comprise proximity sensors 352. One or more lights 354 may also be attached to the back section 322 and canopy 325. Panel handles 356 may also be used by a user for manual actuation of the wall panel 122, such as in the event of power failure. Further, floor shelving (or platforms) 327, 329 may also be utilized, allowing a user to extend the floor shelving units 327, 329 to the exterior of the vehicle as well. This may be accomplished using a rail assembly mounted to the floor of the vehicle.

In one embodiment, a vehicle rail system comprises a slidable bulkhead, the bulkhead coupled to, and slidable on, one or more fixed rails, the fixed rails coupled to one or more support legs of a frame, the fixed rails separating the driver's seat from the cargo compartment of the vehicle such that the bulkhead separates the driver from the cargo compartment. The bulkhead may be configured to slide out of one or both sides of a vehicle.

In one embodiment, a vehicle rail system comprises a gantry coupled to a fixed rail, the fixed rail mounted on, or proximal to, the ceiling, the gantry slidable on the fixed rail via a sliding rail such that the gantry is capable of extending to the exterior of the vehicle. The gantry may have a winch or pulleys attached thereto for hoisting cargo.

Figure 26:
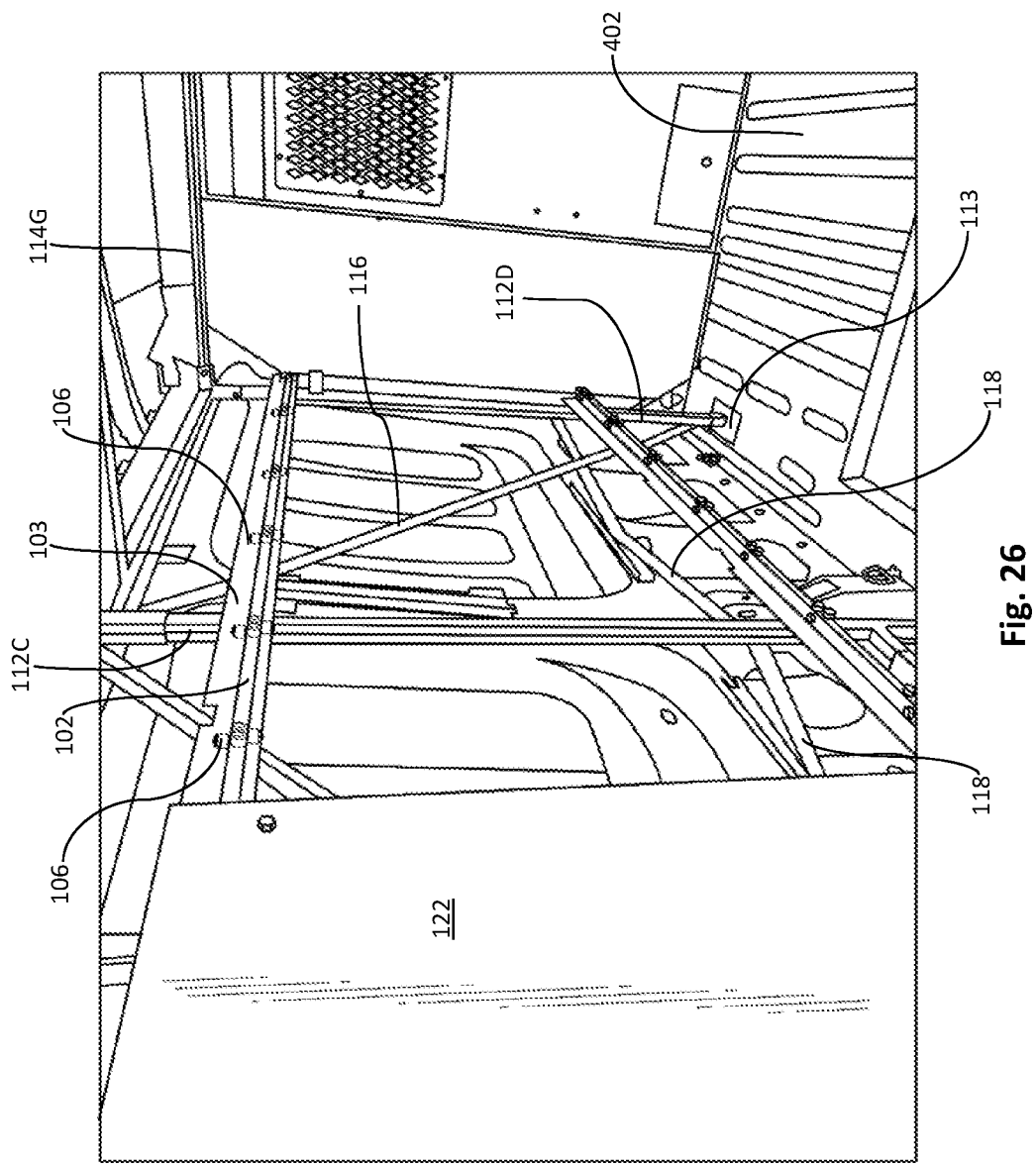
FIG. 26 illustrates the rail system for mounting to a vehicle, mounted in a vehicle.
Figure 27:
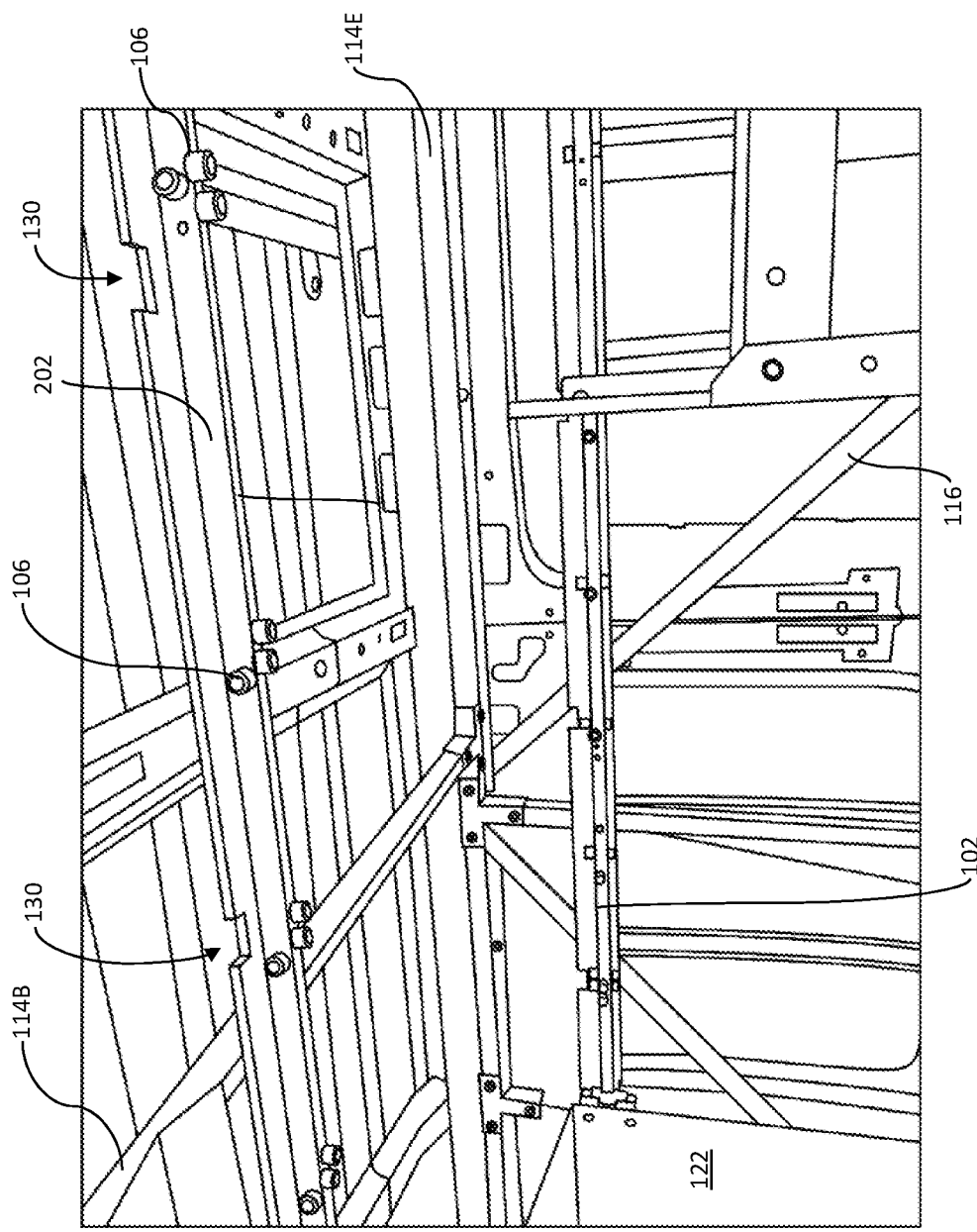
FIG. 27 illustrates the rail system for mounting to a vehicle, mounted in a vehicle, comprising a top rail for a canopy.
Figure 28:
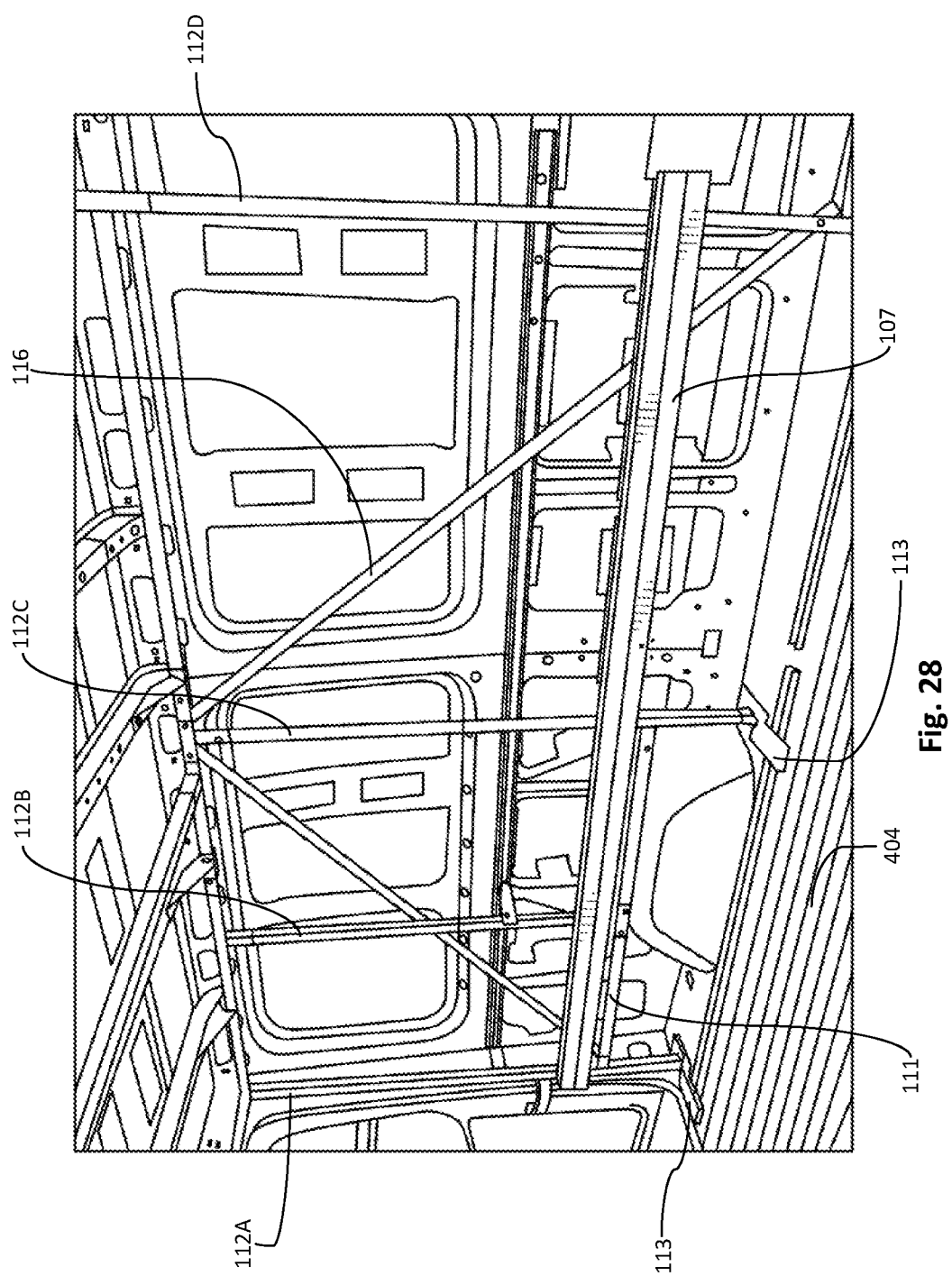
FIG. 28 illustrates the rail system for mounting to a vehicle, mounted in a vehicle.

FIG. 26 illustrates the frame 110 mounted inside the cargo area 402 of a vehicle 400, which, for this example, is in a panel van. As shown, the support frame 110 mounts to the cargo area via base plates 113, securing members 118, and horizontal beams 114. Other embodiments may use mounting rails 311A-C, as illustrated in FIGS. 24-25 to secure to the vehicle. Likewise, securing members 118 are not required. FIG. 27 illustrates the frame with a ceiling fixed rail 202 for use with a canopy 225, 325. As shown in FIG. 28, base plates 113 mount to the floor 404 of a vehicle 400, with support legs 112A-112D coupled thereto. As appreciated, not all support legs are required to be mounted to the floor 404. For example, support leg 112B may not extend to the floor 404, and may couple to a lower horizontal support beam 111. In this view, sliding rail 107 is shown coupled to the fixed rail (not visible in this view). In practice, one or more additional rail assemblies may be added, allowing a user to couple a panel, shelving, or other items thereto. However, a user may use as few as one rail assembly (comprising a fixed rail and a sliding rail) on the frame. In such a scenario, the single rail assembly may be placed at any height along the support legs 112.

Figure 29:
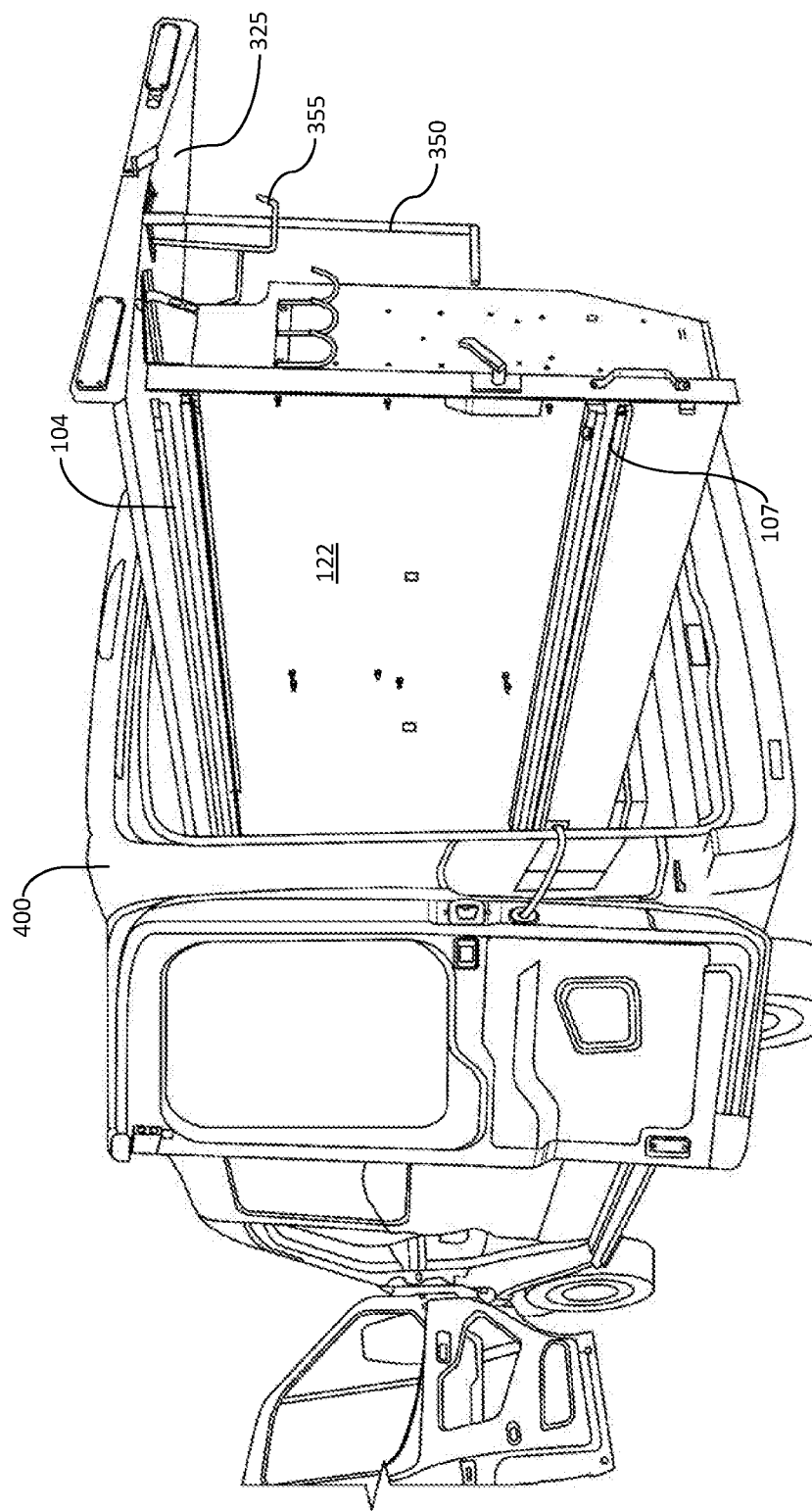
FIG. 29 illustrates a rear, back perspective view of a wall panel of a rail system for mounting to a vehicle extended out of the vehicle.
Figure 30:
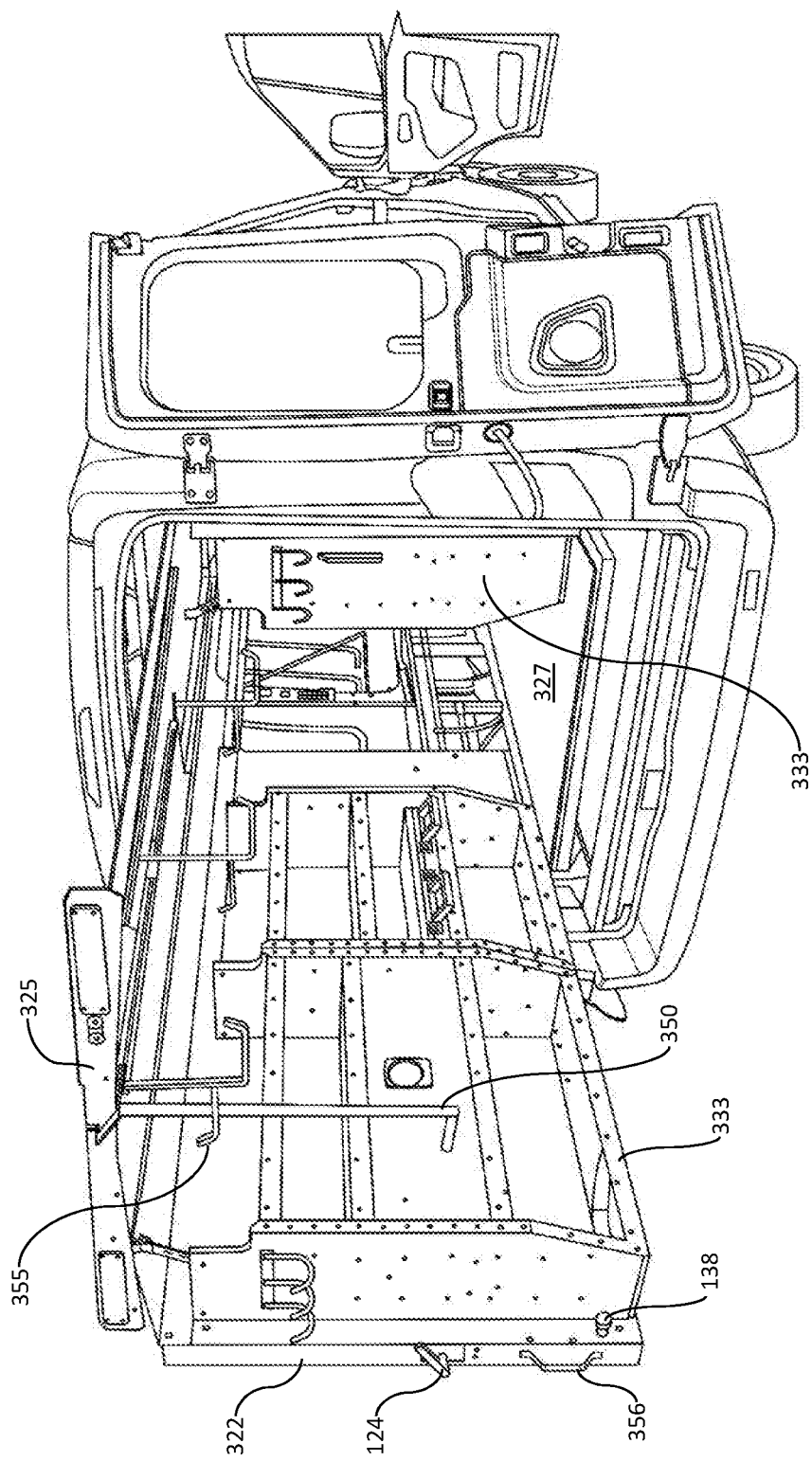
FIG. 30 illustrates a rear, front perspective view of a wall panel of a rail system for mounting to a vehicle extended out of the vehicle.
Figure 31:
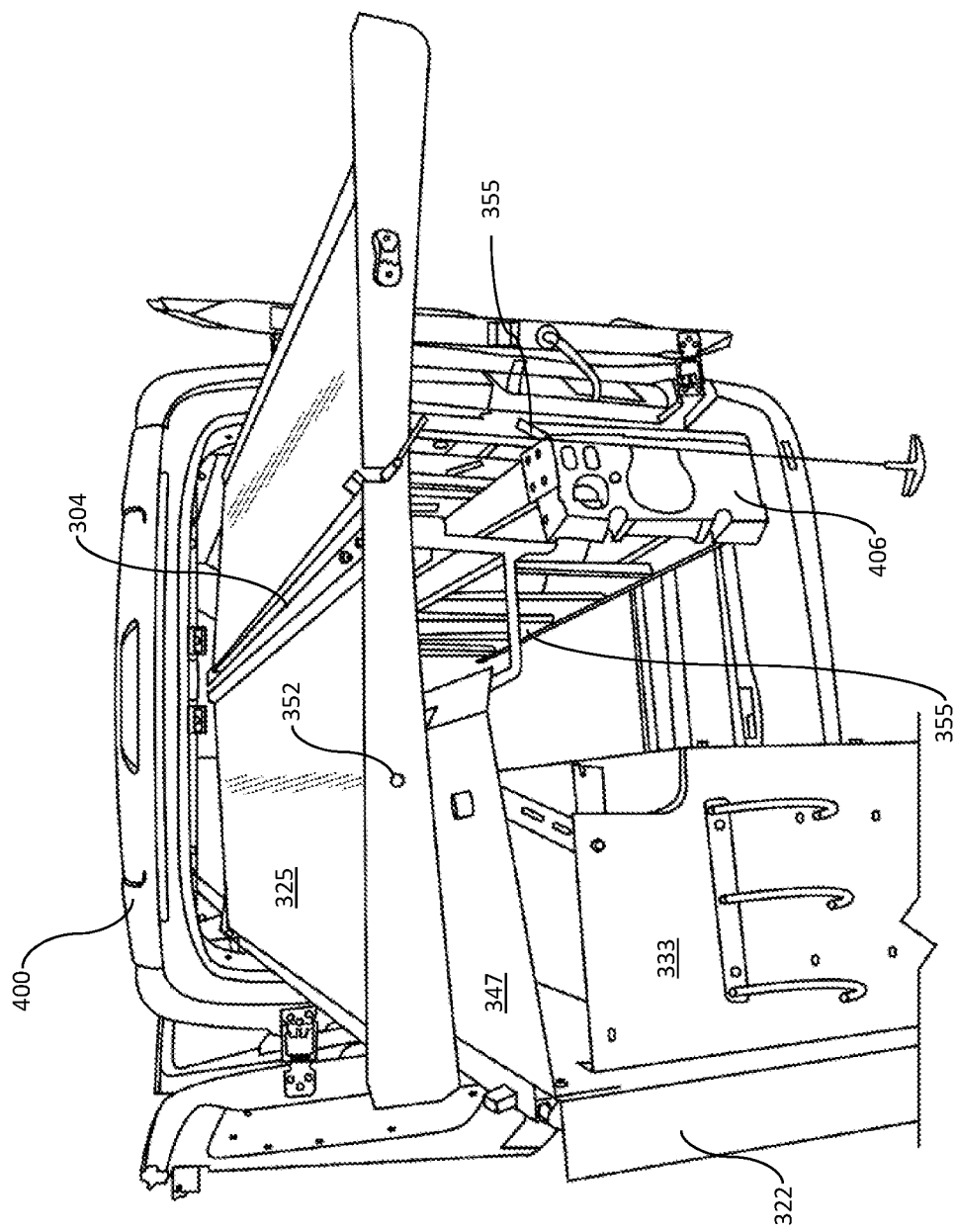
FIG. 31 illustrates a rear, top perspective view of a wall panel of a rail system for mounting to a vehicle extended out of the vehicle.
Figure 32:
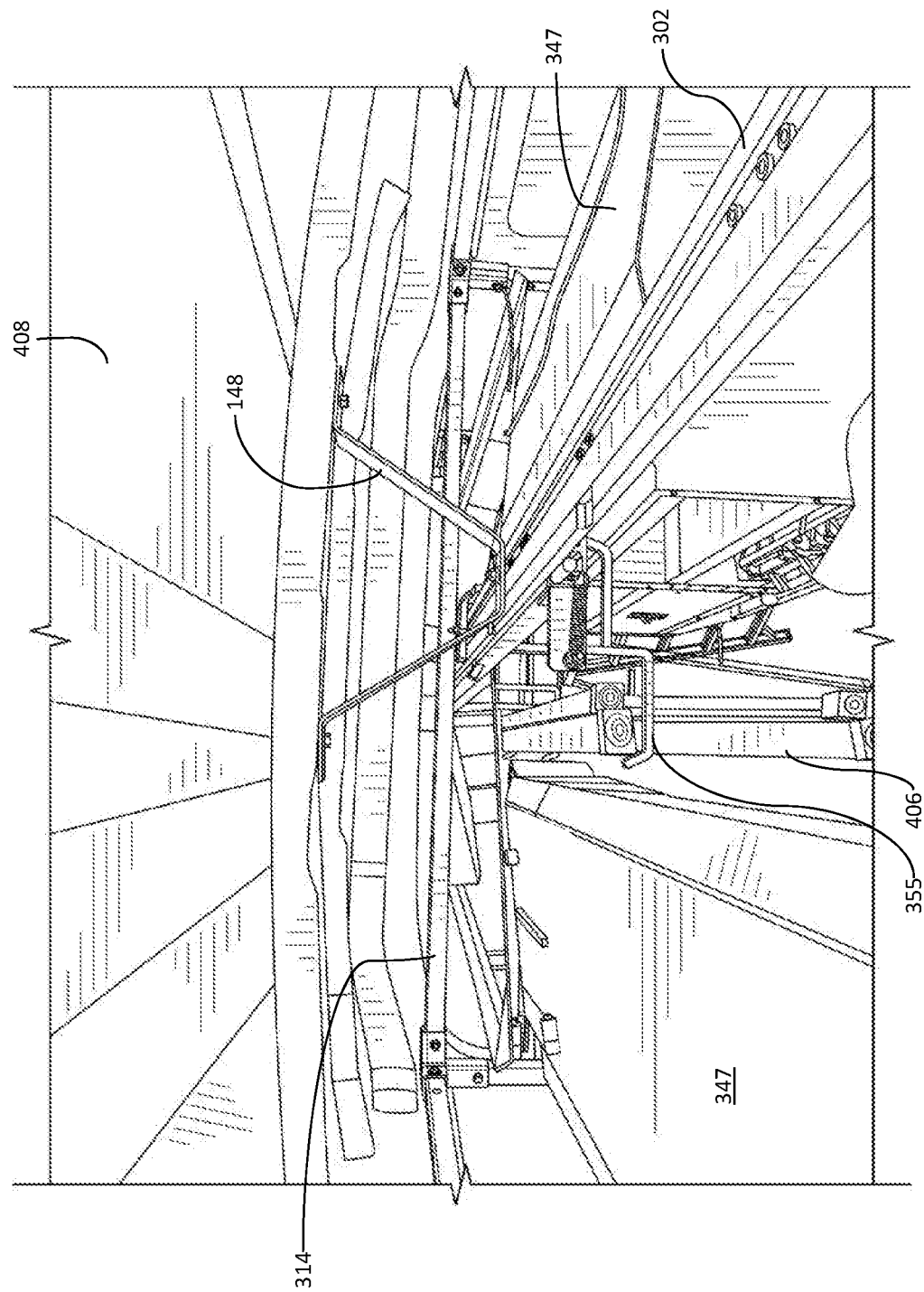
FIG. 32 illustrates the rail system for mounting to a vehicle, mounted in a vehicle, comprising a top rail for a canopy.

FIG. 29 is a back view of a wall panel 122 and canopy 325 extended from within the cargo area of the vehicle 400. FIG. 30 is a front view of wall panel 122 with shelving 333 thereon. FIG. 31 illustrates a top view of canopy 325 extended from within the vehicle 400. The canopy 325 being coupled to sliding rail 304, sliding rail 304 slidable on a fixed rail 302 mounted to the horizontal beams (not visible in this view) within the vehicle. As shown, in one non-limiting example of use, a ladder 406 may be hung from hooks 355. Referring to FIG. 32, the ceiling-mounted fixed rail 302 is shown, the fixed rail 302 being mounted to the ceiling 408 of the vehicle using brackets 148. It will be appreciated that the brackets 148 may be used alone, or in combination with horizontal beams 314 to secure the fixed rail 302 to the ceiling 408 of the vehicle 400.

Figure 33:
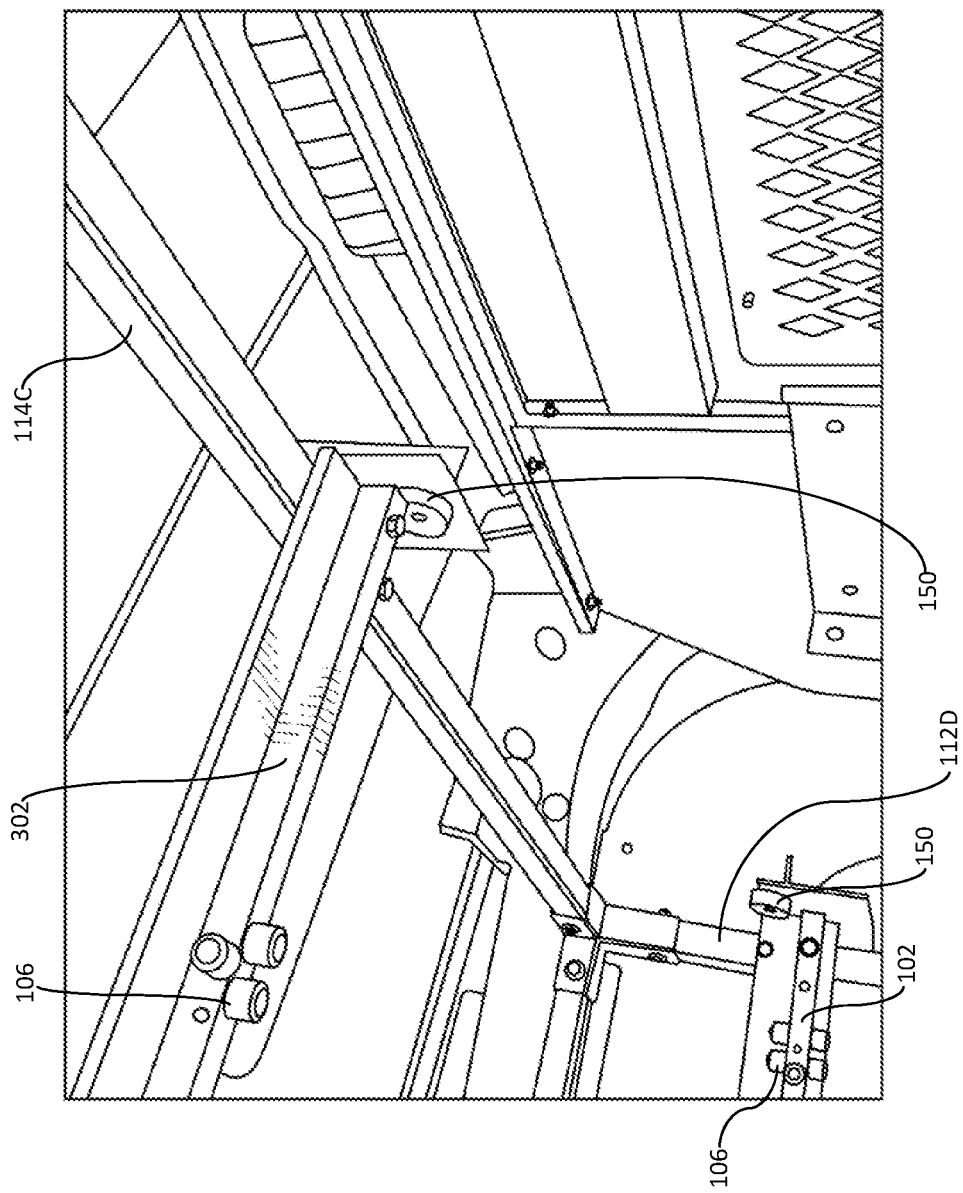
FIG. 33 illustrates the rail system for mounting to a vehicle, mounted in a vehicle, comprising bump stops at the end of each fixed rail.

FIG. 33 illustrates bump stops 150 to prevent a wall panel or canopy from sliding off the end of the fixed rails 102, 302.

A cart apparatus may be used with the vehicle rail system described above to aid in the removal and replacement of the sliding rail and associated components (e.g., wall panel, shelving, etc.) of the vehicle rail system. The cart comprises a base frame with a plurality of casters (or wheels), a vertical support frame coupled to, and supported on, the base frame, the vertical support frame having a plurality of fixed rails thereon for engaging the sliding rails as they extend from the vehicle, the fixed rails of the vertical frame being substantially similar to the fixed rails 102, 105 of the vehicle rail system 100. In one embodiment, the vertical frame has one or more actuators (e.g., piston and cylinder) to control the height and angle of the fixed rails thereon for coupling to the sliding rails of the wall panel on varying terrain and/or vehicle heights. In one embodiment, a sliding rail may have one or more securing mechanisms (e.g., locking bolts) to prevent the sliding rail from being inadvertently removed from both the vehicle or the cart. For example, a user would extend the sliding rail from the vehicle and engage the sliding rail with the fixed rails of the vertical frame. Once engaged and supported by the cart, the locking bolt may be removed from the vehicle side of the sliding rail, allowing the sliding rail to then be fully-removed from the vehicle fixed rails. A locking bolt may be placed on the cart before or after the locking bolt is removed from the second end of the sliding rail. While locking bolts are used as an example, any stopping or locking mechanism known in the art may be used, such as cotter pins, spring loaded pins, etc. Allowing the sliding rail to be removable from the vehicle is beneficial for a number of industries. For example, in the parcel delivery industry, the packages are generally sorted multiple times, after-which the packages are then loaded into the appropriate vehicle. This is time and labor intensive, and is not comfortable or safe for a user who must enter and exit a vehicle multiple times to load packages. To solve this need, and to eliminate wasted time and resources, and to reduce injury, the shelving on the sliding rails of the vehicle may be removed onto the cart apparatus. At the sorting station, the packages may be placed directly onto the shelving as they are sorted. Once sorted and on the shelves, the cart apparatus may then be transported to the vehicle where the sliding rail with the shelving and packages may be directly inserted into the vehicle, receivable on the fixed rails of the vehicle. As such, a user need not enter the vehicle to load packages. This creates an enormous advantage over the prior art and the industry standard, which involves individuals entering and exiting the vehicle multiple times to load it. Further, when on delivery site, the user need not enter the vehicle to select a package. Rather, the sliding rail may be extended from within the vehicle, allowing a user access to the packages. While the parcel industry is used as an example above, the advantages in other industries are readily apparent—such as the loading and unloading of construction materials, etc.

It is appreciated from the foregoing that the vehicle rail system allows a user to extend shelving thereon without entry into a vehicle and that provides for the storage of extremely heavy items, that provides for multiple locking positions, that may be motorized for ease of extension and insertion, and that provides for multi-surface application, including the ceiling for both storage and a canopy system, that provides for user and equipment safety, and that allows for easy removal and replacement of shelving.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A rail system for mounting to a vehicle, comprising:
a frame mountable in the cargo area of a vehicle, the frame comprising a first support leg and a second support leg, each support leg having a first end adapted to attach to the vehicle and a second end;
a first fixed rail mounted to the frame, the first fixed rail comprising:
a front face,
a back face,
first and second side faces,
a plurality of bearings mounted to one or more faces of the first fixed rail, and
a back plate mounted to the back face of the first fixed rail, the back plate comprising a plurality of locking apertures;
a first sliding rail slidably mounted on the first fixed rail for longitudinal movement relative to the first fixed rail, the first sliding rail comprising:
a utility side,
a groove side comprising one or more grooves for receiving the plurality of bearings coupled to the first fixed rail, and
a movable locking tab that mates with the locking apertures of the first fixed rail; and
a first panel coupled to the first sliding rail.

2. The rail system for mounting to a vehicle of claim 1, wherein the locking tab is mounted on a rotatable rod received in a channel of the sliding rail to allow for rotatable movement of the locking tab.

3. The rail system for mounting to a vehicle of claim 1, wherein the frame further comprises a cross member connected with the second end of the first leg and the second end of the second leg.

4. The rail system for mounting to a vehicle of claim 1, wherein the cross member extends parallel to a floor of the vehicle.

5. The rail system for mounting to a vehicle of claim 4, wherein the cross member extends horizontally.

6. The rail system for mounting to a vehicle of claim 4, wherein the first fixed rail attaches to the cross member.

7. The rail system for mounting to a vehicle of claim 1, wherein the first fixed rail is a ceiling fixed rail.

8. The rail system for mounting to a vehicle of claim 1, wherein the first panel is a canopy.

9. The rail system for mounting to a vehicle of claim 8 further comprising a second fixed rail mounted to the frame.

10. The rail system for mounting to a vehicle of claim 9, wherein the second fixed rail attaches to the first support leg and the second support leg.

11. The rail system for mounting to a vehicle of claim 10 further comprising a second sliding rail slidably mounted to the second fixed rail.

12. The rail system for mounting to a vehicle of claim 11 further comprising a second panel coupled to the second sliding rail.

13. The rail system for mounting to a vehicle of claim 11, wherein the second panel is a wall panel.

14. A rail system for mounting to a vehicle, comprising:
a frame mountable in the cargo area of a vehicle;
a first fixed rail mounted to the frame, the first fixed rail comprising:
a front face,
a back face,
first and second side faces,
a plurality of bearings mounted to one or more faces of the first fixed rail, and
a back plate mounted to the back face of the first fixed rail, the back plate comprising a plurality of locking apertures;
a first sliding rail slidably mounted on the first fixed rail for longitudinal movement relative to the first fixed rail, the first sliding rail comprising:
a utility side,
a groove side comprising one or more grooves for receiving the plurality of bearings coupled to the first fixed rail, and
a movable locking tab that mates with the locking apertures of the first fixed rail;
a first panel coupled to the first sliding rail; and an actuator that controls the longitudinal movement of the first sliding rail between a first position and a second position.

15. The rail system for mounting to a vehicle of claim 14, wherein the actuator comprises a drive control system.

16. The rail system for mounting to a vehicle of claim 15, wherein the drive control system comprises a sensor.

17. The rail system for mounting to a vehicle of claim 16, wherein the sensor provides information to the drive control system indicating that the first sliding rail has reached the second position.

18. The rail system for mounting to a vehicle of claim 17, wherein the actuator comprises a motor, and the drive control system deactivates the motor upon receiving the information from the sensor.

19. The rail system for mounting to a vehicle of claim 16, wherein the sensor provides information to the drive control system indicating that the first sliding rail has reached a third position between the first position and the second position.

20. The rail system for mounting to a vehicle of claim 19, wherein the actuator comprises a motor, and the drive control system slows the motor upon receiving the information from the sensor.

* * * * *